US006104382A

United States Patent [19]
Martin et al.

[11] Patent Number: 6,104,382
[45] Date of Patent: Aug. 15, 2000

[54] FORCE FEEDBACK TRANSMISSION MECHANISMS

[75] Inventors: Kenneth M. Martin, Palo Alto; Michael D. Levin; Adam C. Braun, both of Sunnyvale, all of Calif.

[73] Assignee: Immersion Corporation, San Jose, Calif.

[21] Appl. No.: 09/058,259

[22] Filed: Apr. 10, 1998

Related U.S. Application Data

[63] Continuation-in-part of application No. 08/961,790, Oct. 31, 1997.

[51] Int. Cl.[7] .................................................. G06F 3/033
[52] U.S. Cl. ............................................................ 345/161
[58] Field of Search ................................... 345/156, 157, 345/161; 463/38, 37; 338/128; 248/278.1; 273/148 B; 318/568.11; 414/5; 244/228; 434/45; 74/523

[56] References Cited

U.S. PATENT DOCUMENTS

| | | | |
|---|---|---|---|
| 3,490,059 | 1/1970 | Paulsen et al. | 73/133 |
| 3,795,150 | 3/1974 | Eckhardt | 74/5.4 |
| 3,875,488 | 4/1975 | Crocker et al. | 318/648 |
| 3,903,614 | 9/1975 | Diamond et al. | 35/12 S |
| 3,919,691 | 11/1975 | Noll | 340/172.5 |
| 4,027,963 | 6/1977 | Hoppner et al. | 355/8 |
| 4,148,014 | 4/1979 | Burson | 340/709 |
| 4,174,833 | 11/1979 | Hennig et al. | 273/1 E |
| 4,216,467 | 8/1980 | Colston | 340/365 L |
| 4,398,889 | 8/1983 | Lam et al. | 434/45 |
| 4,436,188 | 3/1984 | Jones | 188/378 |
| 4,477,043 | 10/1984 | Repperger | 244/223 |
| 4,489,304 | 12/1984 | Hayes | 338/128 |
| 4,603,284 | 7/1986 | Perzley | 318/568 |
| 4,632,341 | 12/1986 | Repperger et al. | 244/230 |
| 4,677,355 | 6/1987 | Baumann | 318/160 |
| 4,724,715 | 2/1988 | Culver | 74/471 R |

(List continued on next page.)

FOREIGN PATENT DOCUMENTS

| | | |
|---|---|---|
| 0085518 | 1/1983 | European Pat. Off. . |
| 0 085 518 | 8/1983 | European Pat. Off. . |
| 0 111 992 | 6/1984 | European Pat. Off. . |
| 0470257A1 | 2/1992 | European Pat. Off. . |
| 0655301A1 | 5/1995 | European Pat. Off. . |
| 0875819 | 11/1998 | European Pat. Off. . |
| WO9520788 | 8/1995 | WIPO . |
| WO9532459 | 11/1995 | WIPO . |

OTHER PUBLICATIONS

Frederick P. Brooks, Jr. et al., "Project GROPE–Haptic Displays for Scientific Visualization," Computer Graphics, vol. 24 #4, Aug. 1990, pp. 177–185.

(List continued on next page.)

*Primary Examiner*—Matthew Luu
*Assistant Examiner*—Jeff Piziali
*Attorney, Agent, or Firm*—James R. Riegel

[57] ABSTRACT

A mechanism for providing selective engagement of spring members to a user manipulatable object in a force feedback interface device. A moveable member included in a force feedback mechanism is moveable in a degree of freedom to transmit forces to the user manipulatable object, such as a joystick handle. A spring member can be selectively coupled and decoupled between a grounded member and the moveable member. The spring member provides a spring force on the moveable member that biases the joystick handle to a desired position, such as the center of the degree of freedom. A dynamic calibration procedure reduces inaccuracies when sensing the position of the user manipulandum by only reading new range limits when the actuator is not outputting a force in the direction of that limit. A capstan drive mechanism is preferably coupled between the actuator and linkage mechanism, where a capstan drum includes a curved end over which the cable is routed, the curved end including flanges to substantially prevent the cable from slipping of the sides of the end. The capstan drum includes a tensioning spring member coupled to one or both ends of the cable for tensioning the cable.

42 Claims, 9 Drawing Sheets

U.S. PATENT DOCUMENTS

| | | | |
|---|---|---|---|
| 4,775,289 | 10/1988 | Kazerooni | 414/735 |
| 4,795,296 | 1/1989 | Jau | 414/5 |
| 4,800,721 | 1/1989 | Cemenska et al. | 60/393 |
| 4,803,413 | 2/1989 | Kendig et al. | 318/648 |
| 4,811,608 | 3/1989 | Hilton | 73/862.04 |
| 4,819,195 | 4/1989 | Bell et al. | 364/571.05 |
| 4,823,634 | 4/1989 | Culver | 74/471 XY |
| 4,857,881 | 8/1989 | Hayes | 338/128 |
| 4,861,269 | 8/1989 | Meenen, Jr. | 434/45 |
| 4,868,549 | 9/1989 | Affinito et al. | 340/710 |
| 4,914,976 | 4/1990 | Wyllie | 74/523 |
| 4,935,728 | 6/1990 | Kley | 340/709 |
| 4,961,038 | 10/1990 | MacMinn | 318/696 |
| 4,983,901 | 1/1991 | Lehmer | 318/685 |
| 5,007,300 | 4/1991 | Siva | 74/471 XY |
| 5,044,956 | 9/1991 | Behensky et al. | 434/45 |
| 5,056,787 | 10/1991 | Mitsuyoshi | 273/148 B |
| 5,076,517 | 12/1991 | Ferranti et al. | 244/228 |
| 5,103,404 | 4/1992 | McIntosh | 318/568.22 |
| 5,107,080 | 4/1992 | Rosen | 200/6 A |
| 5,116,051 | 5/1992 | Moncrief et al. | 273/448 B |
| 5,116,180 | 5/1992 | Fung et al. | 414/5 |
| 5,125,261 | 6/1992 | Powley | 73/1 J |
| 5,142,931 | 9/1992 | Menahem | 74/471 XY |
| 5,143,505 | 9/1992 | Burdea et al. | 414/5 |
| 5,146,566 | 9/1992 | Hollis, Jr. et al. | 395/275 |
| 5,156,363 | 10/1992 | Cizewski et al. | 244/223 |
| 5,182,557 | 1/1993 | Lang | 341/20 |
| 5,184,319 | 2/1993 | Kramer | 364/806 |
| 5,185,561 | 2/1993 | Good et al. | 318/432 |
| 5,189,355 | 2/1993 | Larkins et al. | 318/685 |
| 5,193,963 | 3/1993 | McAffee et al. | 414/5 |
| 5,220,260 | 6/1993 | Schuler | 318/561 |
| 5,223,776 | 6/1993 | Radke et al. | 318/568 |
| 5,228,356 | 7/1993 | Chuang | 74/471 |
| 5,230,623 | 7/1993 | Guthrie et al. | 433/72 |
| 5,235,868 | 8/1993 | Culver | 74/471 XY |
| 5,264,768 | 11/1993 | Gregory et al. | 318/561 |
| 5,275,565 | 1/1994 | Moncrief | 434/29 |
| 5,286,203 | 2/1994 | Fuller et al. | 434/45 |
| 5,296,846 | 3/1994 | Ledley | 345/161 |
| 5,317,336 | 5/1994 | Hall | 345/164 |
| 5,327,790 | 7/1994 | Levin et al. | 73/862.325 |
| 5,347,476 | 9/1994 | McBean, Sr. | 364/571.04 |
| 5,379,663 | 1/1995 | Hara | 74/471 XY |
| 5,389,865 | 2/1995 | Jacobus et al. | 318/568.11 |
| 5,396,266 | 3/1995 | Brimhall | 345/161 |
| 5,399,091 | 3/1995 | Mitsumoto | 434/61 |
| 5,402,582 | 4/1995 | Raab | 33/503 |
| 5,405,152 | 4/1995 | Katanics et al. | 273/438 |
| 5,414,337 | 5/1995 | Schuler | 318/561 |
| 5,436,638 | 7/1995 | Bolas et al. | 345/156 |
| 5,436,640 | 7/1995 | Reeves | 345/161 |
| 5,451,924 | 9/1995 | Massimino et al. | 340/407.1 |
| 5,473,235 | 12/1995 | Lance et al. | 318/561 |
| 5,482,051 | 1/1996 | Reddy et al. | 128/733 |
| 5,512,919 | 4/1996 | Araki | 345/156 |
| 5,513,100 | 4/1996 | Parker et al. | 364/167.01 |
| 5,530,455 | 6/1996 | Gillick et al. | 345/163 |
| 5,576,727 | 11/1996 | Rosenberg et al. | 345/179 |
| 5,577,981 | 11/1996 | Jarvik | 482/4 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,591,082 | 1/1997 | Jensen et al. | 463/38 |
| 5,611,731 | 3/1997 | Bouton et al. | 463/37 |
| 5,623,582 | 4/1997 | Rosenberg | 395/99 |
| 5,629,594 | 5/1997 | Jacobus et al. | 318/568.11 |
| 5,631,861 | 5/1997 | Kramer | 364/406 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,691,898 | 11/1997 | Rosenberg et al. | 364/190 |
| 5,694,153 | 12/1997 | Aoyagi et al. | 345/161 |
| 5,709,219 | 1/1998 | Chen et al. | 128/782 |
| 5,721,566 | 2/1998 | Rosenberg et al. | 345/161 |
| 5,724,068 | 3/1998 | Sanchez et al. | 345/161 |
| 5,727,188 | 3/1998 | Hayes | 395/500 |
| 5,731,804 | 3/1998 | Rosenberg | 345/156 |
| 5,734,373 | 3/1998 | Rosenberg et al. | 345/161 |
| 5,742,278 | 4/1998 | Chen et al. | 345/156 |
| 5,749,577 | 5/1998 | Couch et al. | 273/148 B |
| 5,754,023 | 5/1998 | Roston et al. | 318/561 |
| 5,755,577 | 5/1998 | Gillio | 434/262 |
| 5,767,839 | 6/1998 | Rosenberg | 345/161 |
| 5,769,640 | 6/1998 | Jacobus et al. | 434/262 |
| 5,779,209 | 7/1998 | Rello | 248/278.1 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,821,920 | 10/1998 | Rosenberg et al. | 345/156 |
| 5,823,876 | 10/1998 | Unbehand | 463/37 |
| 5,825,308 | 10/1998 | Rosenberg | 341/20 |
| 5,828,197 | 10/1998 | Martin et al. | 318/567 |
| 5,829,745 | 11/1998 | Houle | 273/148 B |
| 5,844,392 | 12/1998 | Peurach et al. | 318/568.17 |
| 5,872,438 | 2/1999 | Roston | 318/568.11 |
| 5,889,670 | 3/1999 | Schuler et al. | 364/186 |

OTHER PUBLICATIONS

Louis Rosenberg, "A Force Feedback Programming Primer," Immersion Corporation, 1997, pp. 1–176.

Patrick Fischer et al., "Specification and Design of Input Devices for Teleoperation," IEEE CH2876-1, 1990, pp. 540–545.

J. Edward Colgate et al., "Implementation of Stiff Virtual Walls in Force–reflecting Interfaces," Dept. of Mechanical Engineering, Northwestern Univ., Evanston IL. 1993, pp. 1–7.

Antal K. Bejczy et al., "The Phantom Robot: Predictive Displays for Teleoperation with Time Display," IEEE CH2876-1, 1990, pp. 546–550.

Louis B. Rosenberg, "The Use of Virtual Fixtures as Perceptual Overlays to Enhance Operator Performance in Remote Environments" Crew Systems Directorate Biodynamics and Biocommunications Div., Wright–Patterson AFB OH 45433–7901, 1992, pp. 1–42.

Louis B. Rosenberg, "Virtual Fixtures as Tools to Enhance Operator Performance in Telepresence Environments," SPIE Telemanipulator Technology, 1993.

Louis B. Rosenberg, "Perceptual Design of a Virtual Rigid Surface Contact", Armstrong Laboratory, Crew Systems Directorate, Air Force Materiel Command, 1993, pp. 1–40.

Bernard D. Adelstein et al., "A High Performance Two Degree–of–freedom Kinesthetic Interface", MIT, Cambridge, MA, 1992, pp. 108–112.

Tan, H. et al., "Human factors for the design of force–reflecting haptic interfaces", Dept. Of Mech Engineering, MIT, 1994, pp. 1–11.

Tetsuo Kotoku, "A Predictive Display with Force Feedback and its Application to Remote Manipulation System with Transmission Time Delay", IEEE 0–7803–0737–2, 1992, pp. 239–246.

Louis B. Rosenberg et al., "The use of force feedback to enhance graphical user interfaces," Stereoscopic Displays and Virtual Reality Systems, Proc. SPIE 2653, 19, 1996, pp. 243–248.

Bernard D. Adelstein et al., "Design and Implementation of a Force Reflecting Manipulandum for Manual Control Research" NASA Ames Research/Dept. of Mechanical Engineering, MIT, 1992, pp. 1–24.

Pietro Buttolo et al., "Pen–based Force Display for Precision Manipulation in Virtual Environments", IEEE 0–8186–7084–3, 1995, pp. 217–224.

Brain Schmult et al., "Application Areas for a Force–feedback Joystick", DSC–vol. 49, Advances in Robotics, Mechatronics, and Haptic Interfaces, 1993, pp. 47–54.

S.C. Jacobson et al., "High Performance, High Dexterity, Force Reflective Teloperator II", ANS Topical Meeting on Robotics and Remote Systems, 1991, pp. 1–10.

Margaret Minsky, et al., "Feeling and Seeing: Issues in Force Display", Dept. of Computer Science, University of NC at Chapel Hill, ACM 1990 089791–351–5, pp. 235–242, 270.

Koichi Hirota et al., "Development of Surface Display", IEEE 0–7803–1363–1, 1993, pp. 256–262.

A.J. Kelley et al., "Magicmouse: Tactile and Kinesthetic feedback in the Human–compute Interface Using an Eletromagnetically Actuated Input/output Device", Dept. of Electrical Engineering, University of British Columbia, Vancouver, BC, 1993, pp. 1–27.

Hiroo Iwata, "Aritificial Reality with Force–feedback: Development of Desktop Virtual Space with Compact Master Manipulator", ACM 0–89791–344–2, 1990, pp. 165–170.

Vincent Hayward et al., "Design and Multi–Objective Optimization of a Linkage for a Haptic Interface," Advances in Robot Kinematics and Computationed Geometry, Kluwer Academic Publishers, 1994, pp. 359–368.

Kilpatrick, Paul Jerome, "The Use of Kinesthetic Supplement in an Interactive Graphics System", University of North Carolina at Chapel Hill, 1976, pp. 1–175.

Winey III, Calvin, "Computer Simulated Visual and Tactile Feedback as an Aid to Manipulator and Vehicle Control," Dept. of Mech. Engineering, MIT, 1981, pp. 1–79.

Hannaford, B. et al., "Performance Evaluation of a Six–Axis Generalized Force–Reflecting Teleoperator," IEEE Transactions on Systems, Man, and Cybernetics, vol. 21, No. 3, 1991, pp. 620–623, 631–633.

Atkinson, W. et al., "Computing with Feeling," Comput. & Graphics, vol. 2, 1977, pp. 97–103.

Millman, Paul et al., "Design of a Four Degree–of–Freedom Force–Reflecting Manipulandum with a Specified Force/Torque Workspace," Proc. of 1991 IEEE Int'l Conf. on Robotics and Automation, IEEE, 1991, pp. 1488–1493.

Howe, R. et al., "Task Performance with a Dextrous Tele-operated Hand System," Telemanipulator Technology '92, Proc. of SPIE, vol. 1833, 1992, pp. 1–9.

Batter, J. et al., "Grope–1: A Computer Display to the Sense of Feel," Proc. IFIP Congress 1971, pp. 759–763.

Ouh–young, M., "Force Display in Molecular Docking," Dept. of Computer Science, Univ. of N. Carolina at Chapel Hill, 1990, pp. 1–12, 66–85.

Ellis, R.E. et al., "Design and Evaluation of a High–Performance Prototype Planar Haptic Interface," DSC–Vol. 49, Advances in Robotics, Mechatronics, and Haptic Interfaces, ASME 1993, pp. 55–64.

Rosenberg, L. et al., "Commercially Viable Force Feedback Controller for Individuals with Neuromotor Disabilities," Crew Systems Directorate, Wright–Patterson AFB, 1996, pp. 1–33.

Gotow, J.K. et al., "Perception of Mechanical Properties at the Man–Machine Interface," IEEE CH2503–1, 1987, p. 688–689.

Douglas A. McAffee et al., "Teleoperator Subsystem/Telerobot Demonstrator: Force Reflecting Hand Controller Equipment Manual," Jet Propulsion Laboratory–California Institute of Technology, 1988, pp. 1–11.

Massimo Andrea Russo, "The Design and Implementation of a three Degree–of–Freedom Force Output Joystick," May 11, 1990, Dept. of Mech. Engineering, 1990.

E. Snow et al., "Compact Force–Reflecting Hand Controller," NASA Tech Brief, vol. 15, No. 4, Item #153, 1991, pp. 1–15a.

J.N. Herndon, et al., "The State–of–the–Art Model M–2 Maintenance System," 1984, 1984 Topical Meeting on Robotics and Remote Handling in Hostile Environments, pp. 59–66.

6,104,382

FORCE FEEDBACK TRANSMISSION MECHANISMS

CROSS REFERENCE TO RELATED APPLICATIONS

This application is a continuation-in-part of co-pending parent patent application Ser. No. 08/961,790, filed Oct. 31, 1997, on behalf of Moore et al., entitled "High Fidelity Mechanical Transmission System", assigned to the assignee of the present application, and which is incorporated by reference herein.

BACKGROUND OF THE INVENTION

The present invention relates generally to interface devices between humans and computers, and more particularly to computer interface devices that provide force feedback to the user.

Interface devices are used extensively with computer systems in the implementation of computer-controlled games, simulations, and other applications very popular with the mass market of home consumers. In a typical implementation, a computer system displays a visual environment to a user on a display device. Users can interact with the displayed environment by inputting commands or data from the interface device. Popular interface devices include joysticks, "joypad" button controllers, mice, trackballs, styluses, tablets, pressure spheres, foot or hand pedals, or the like, that are connected to the computer system controlling the displayed environment. The computer updates the environment in response to the user's manipulation of a moved manipulandum such as a joystick handle or mouse, and provides visual feedback to the user using the display screen.

In some interface devices, haptic (e.g., tactile) feedback is also provided to the user, more generally known as "force feedback." These types of interface devices can provide physical sensations to the user manipulating the physical object of the interface device. Typically, motors or other actuators of the interface device are coupled to the manipulandum and are connected to the controlling computer system. The computer system receives sensor signals from the interface device and sends appropriate force feedback control signals to the actuators in conjunction with host events. The actuators then provide forces on the manipulandum. A local microprocessor can be used to offload some computational burden on the host. The computer system can thus convey physical sensations to the user in conjunction with other visual and auditory feedback as the user is contacting the manipulandum. Commercially available force feedback devices include the ForceFX joystick from CH Products, Inc. and Immersion Corporation, and the Sidewinder Force Feedback Pro from Microsoft Corporation.

One problem occurring in the commercially available force feedback devices is the free movement of the manipulandum, such as a joystick handle, when the device is not powered. For example, standard joysticks without force feedback capability typically include physical springs coupled between the joystick handle and the joystick base which provides a spring force on the handle and permanently functions to center the joystick handle in its degrees of freedom, causing the handle to be biased toward a straight and upright position and assisting in playing games. Force feedback joysticks, however, do not include such physical springs. This is because the forces provided by physical springs can interfere with the forces generated by the actuators of the force feedback device, which can greatly reduce the fidelity of generated forces. For example, if a vibration is to be output on the joystick, the force designer may not want a spring force from physical springs to be felt which would interfere with the vibration. However, a problem caused by the lack of physical springs in force feedback joysticks is that the joystick handles are not centered in an upright or other desired position. Although simulated spring forces can be output by the actuators to perform this centering function during normal joystick operation, it remains a problem when the joystick is not powered. For example, store owners or other vendors often display demonstration force feedback joysticks on shelves for users to test the way the handle grip feels. The demonstration joysticks are typically not powered, and since no physical springs are included, the joystick handles are tilted to one side, giving the undesired appearance of a faulty or broken joystick. In addition, spring forces on normal demonstration joystick models give the user an indication of how the joystick feels during normal operation when spring forces are present, which is not possible with unpowered force feedback joysticks. In other situations, the user may not be powering a force feedback joystick for some reason while playing a game, and the normal centering spring forces would not be present on the handle, thus inhibiting game play.

A different problem occurs in force feedback peripherals having a force transmission mechanism such as a cable drive. In some cable drive systems, an actuator transmits forces to a manipulandum by rotating a cable attached to a capstan drum, where the drum is coupled to the manipulandum. The cable typically rides along the end of the drum as the drum is rotated by the actuator. However, if the capstan drum is rotated too far, the cable can move off the end or side of the drums causing the transmission system to become inoperative. A different problem with the cable is keeping it correctly tensioned on the drum. When the cable has one or two ends that are rigidly attached to points on the drum, the assembly process for the system can become time consuming and expensive due to the requirements for tensioning the system. In addition, the cable typically requires re-tensioning as it becomes loose over time from use. Other problems occurring in commercially available force feedback devices include inaccuracies involved with sensing the position of the manipulandum and outputting forces on the manipulandum, such inaccuracies often contributed by plastic or other flexible components used in low-cost devices.

SUMMARY OF THE INVENTION

The present invention provides a force feedback interface device which includes several improvements to the force transmission system. One feature is the use of selectively engageable physical springs which center the force feedback manipulandum when the device is not outputting forces. Other features include a capstan drive mechanism including a cable tensioned by a spring at both ends of the cable, and a capstan drum including flanges for preventing the cable from moving off the side of the drum.

More particularly, a mechanism of the present invention for providing selective engagement of spring members to a user manipulatable object in a force feedback interface device includes a grounded member coupled to a grounded surface, a moveable member included in a force feedback mechanism and moveable in a degree of freedom to transmit forces to a user manipulatable object of the force feedback interface device, and a spring member that can be selectively coupled and selectively decoupled between the grounded member and the moveable member. The spring member preferably provides a spring force on the moveable member that biases the user manipulatable object to a desired position, such as the center of the degree of freedom. The force feedback interface device, including its mechanism, sensors, and actuators, can take a variety of forms.

In one embodiment, a catch mechanism is coupled to the spring member and includes first and second catch members. The first catch member may be selectively engaged and disengaged with the grounded second catch member, e.g. using a latch, and the first and second catch members are coupled to opposite ends of the spring member. The first catch member can include one or more receptacles for receiving pegs coupled to the moveable member. When the spring member is engaged to apply a spring bias to the manipulandum, the peg engages the receptacle as the moveable member is moved. When the spring member is disengaged so that no spring bias is applied to the manipulandum, the first catch member has been moved such that the peg does not engage the receptacle as the moveable member is moved. The first catch member is preferably moveable by a user of the interface device to selectively engage said spring members with the manipulandum, e.g. a portion of the first catch member can extend through an opening in a housing of the force feedback interface device for access by the user. Thus, the catch mechanism that provides the spring return on the manipulandum is also preferably the catch mechanism moved by the user, allowing fewer parts to be used.

A dynamic calibration procedure of the present invention for reducing inaccuracies when sensing the position of the user manipulandum is also preferably employed in a device using, for example, a transmission system such as described herein implemented with semi-flexible materials such as plastic. The dynamic calibration procedure normalizes the sensed position of the user manipulandum based on the range of manipulandum movement sensed up to the current point in time. To prevent detecting a "false" limit caused by an actuator overstressing the transmission system, the calibration procedure preferably only reads new range limits when the actuator is not outputting a force in the direction of that limit.

A method of the present invention for selectively providing a spring force in a force feedback interface device using a physical spring includes providing a spring member between the user manipulandum and a linkage mechanism, selectively decoupling the spring member from the manipulandum when an actuator of said interface device is to output forces on the manipulandum, and selectively coupling the spring member to the manipulandum when the actuator is not to output forces on the manipulandum.

In a different aspect of the present invention, a force feedback interface device coupled to a host computer and providing forces to a user manipulating the interface device includes a user manipulandum for physical contact by a user, a sensor for detecting a position of the manipulandum, an actuator for applying a force to the manipulandum, and a linkage mechanism providing a degree of freedom and transmitting force from the actuator to the manipulandum. Furthermore, a capstan drive mechanism is coupled between actuator and linkage mechanism and includes a capstan pulley, a moveable capstan drum, and a cable coupling the pulley to the drum. In one aspect of the present invention, the capstan drum includes a curved end over which the cable is routed, the curved end including flanges arranged on sides of the curved end to substantially prevent the cable from slipping off the sides of the end. The curved end is preferably a sector, i.e., a portion of a circumference of a cylinder. In a different aspect of the present invention, the capstan drum includes a tensioning spring member coupled to one or both ends of the cable for tensioning the cable.

The improvements of the present invention provide a more versatile and durable force feedback interface device. The selective spring mechanism provides a mechanical spring bias on the user manipulandum in instances when forces are not output or power is not provided to the device, yet allows high-fidelity forces to be transmitted during normal operation by decoupling the spring bias. The capstan drive improvements allow for a more durable drive transmission that reduces problems that might occur with a cable drive, such as the cable becoming loose or the cable slipping from a capstan drum. The dynamic calibration procedure addresses inaccuracies of a described embodiment of the device. These improvements allow a low-cost force feedback device to be more reliable and versatile.

These and other advantages of the present invention will become apparent to those skilled in the art upon reading of the following specification of the invention and a study of the several figures of the drawing.

DETAILED DESCRIPTION OF PREFERRED EMBODIMENTS

Figure 1:
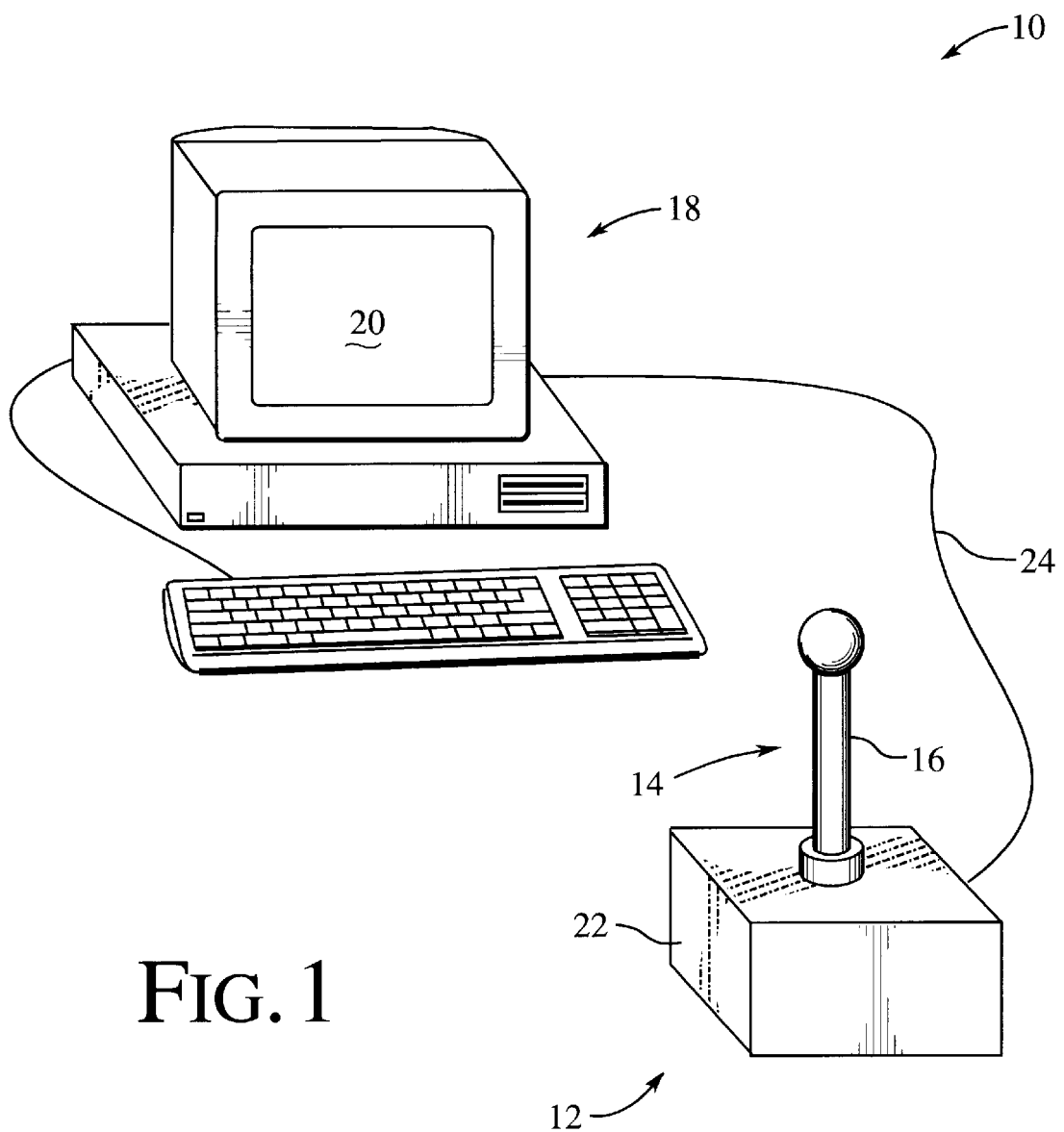
FIG. 1 is a perspective view of a force feedback system which includes a host computer and a force feedback interface device.

In FIG. 1, a force feedback system 10 includes a force feedback interface device 12 and a host computer 18. The illustrated system 10 can used for a virtual reality simulation, video game, training procedure or simulation, computer application program, or other application. In one preferred embodiment, a user manipulatable object 14 is grasped by a user and manipulated. Images are displayed on a display apparatus, such as screen 20, of the computer 18 in response to such manipulations.

The computer 18 can be a personal computer or workstation, such as an IBM-PC compatible computer, Macintosh personal computer, or a SUN or Silicon Graphics workstation. Most commonly, the digital processing system is a personal computer which operates under the Windows™, Unix, MacOS, or similar operating system and may include a host microprocessor such as a Pentium class microprocessor, PowerPC, DEC Alpha, or other type of microprocessor. Alternatively, host computer system 18 can be one of a variety of home video game systems commonly connected to a television set, such as systems available from Nintendo, Sega, or Sony. In other embodiments, host computer system 18 can be a "set top box" which can be used, for example, to provide interactive television functions to users, or a "network-" or "internet-computer" which allows users to interact with a local or global network using standard connections and protocols such as used for the Internet and World Wide Web.

Host computer 18 preferably implements a host application program with which a user is interacting via user object 14 and other peripherals, if appropriate, and which can include force feedback functionality. The software running on the host computer 18 may be of a wide variety. For example, the host application program can be a simulation, video game, Web page or browser that implements HTML or VRML instructions, scientific analysis program, virtual reality training program or application, or other application program that utilizes input of user object 14 and outputs force feedback commands to the user object 14. For example, many game application programs include force feedback functionality and may communicate with the force feedback interface device 12 using a standard protocol/drivers such as I-Force available from Immersion Corporation. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object.

Display device 20 can be included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a game program.

The interface device 12 as illustrated in FIG. 1 is used to provide an interface to the application running on host computer 18. For example, a user manipulatable object (or "manipulandum") 14 grasped by the user in operating the device 12 may be a joystick handle 16 movable in one or more degrees of freedom, as described in greater detail subsequently. It will be appreciated that a great number of other types of user objects can be used with the method and apparatus of the present invention. In fact, the present invention can be used with any mechanical object where it is desirable to provide a human/computer interface with two to six degrees of freedom. Such objects may include joysticks, styluses, surgical tools used in medical procedures, catheters, hypodermic needles, wires, fiber optic bundles, screw drivers, pool cues, etc.

A housing 22 includes a mechanical apparatus for interfacing mechanical input and output is included in interface device 12. The mechanical apparatus mechanically provides the degrees of freedom available to the user object 16 and allows sensors to sense movement in those degrees of freedom and actuators to provide forces in those degrees of freedom. The mechanical apparatus is described in greater detail below. The mechanical apparatus is adapted to provide data from which a computer or other computing device such as a microprocessor (see FIG. 2) can ascertain the position and/or orientation of the user object as it moves in space. This information is then translated to an image on a computer display apparatus such as screen 20. The mechanical apparatus may be used, for example, by a user to change the position of a user controlled graphical object on display screen 20 by changing the position and/or orientation of the user object 14, the computer 18 being programmed to change the position of the graphical object in proportion to the change in position and/or orientation of the user object. In other words, the user object is moved through space by the user to designate to the computer how to update the implemented program.

An electronic interface is also included in housing 22 of interface device 12. The electronic interface couples the device 12 to the computer 18. More particularly, the electronic interface is used in preferred embodiments to couple the various actuators and sensors contained in device 12 (which actuators and sensors are described in detail below) to computer 18. A suitable electronic interface is described in detail with reference to FIG. 2. The electronic interface is coupled to a mechanical apparatus within the interface device 12 and to the computer 18 by a cable 24. In other embodiments, signals can be transmitted between interface device 12 and computer 18 by wireless transmission and reception.

Figure 2:
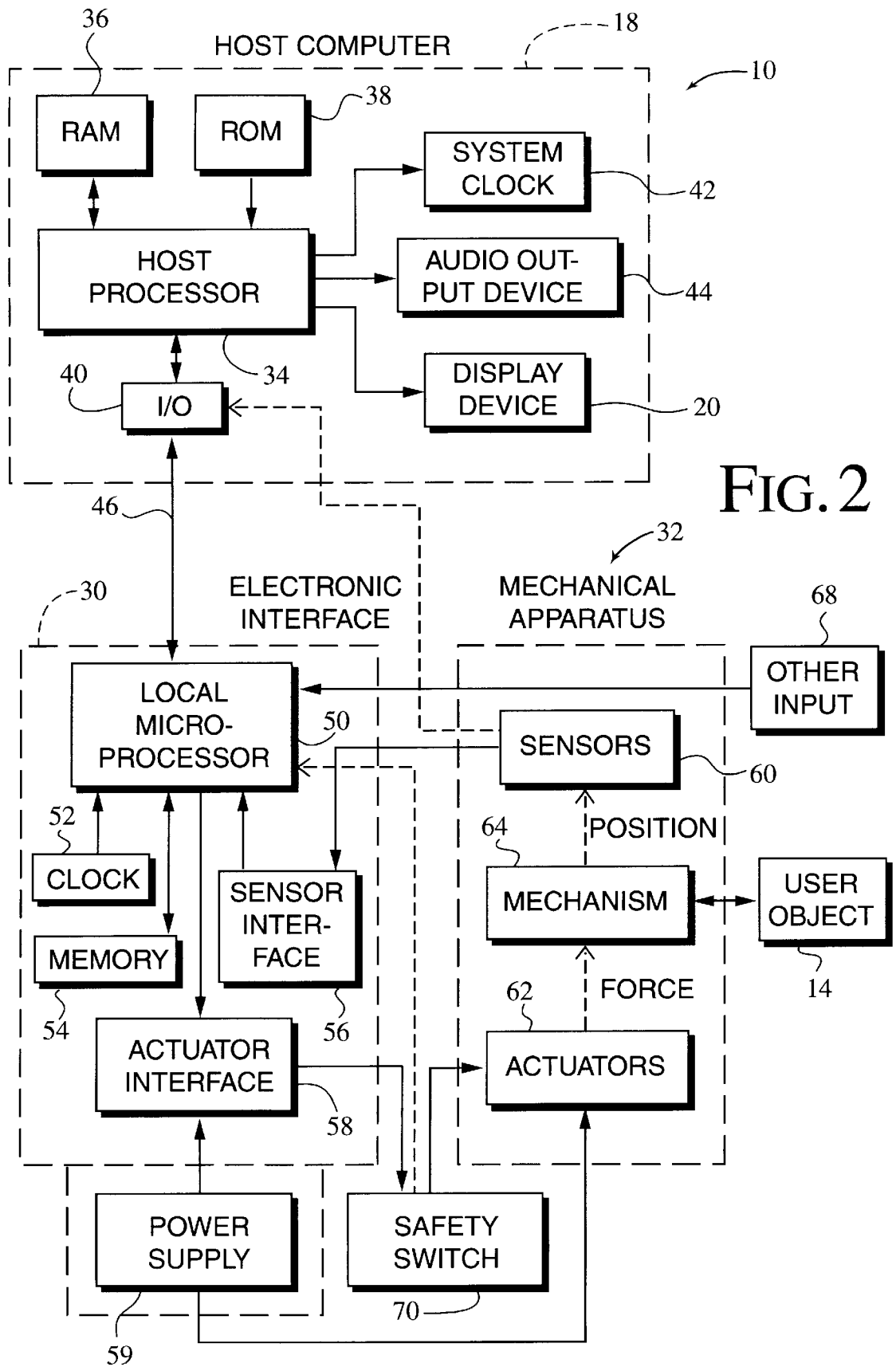
FIG. 2 is a block diagram of the force feedback system of FIG. 1.

FIG. 2 is a block diagram illustrating interface device 12 and host computer 18 suitable for use with the present invention. Interface device 12 includes an electronic interface 30, mechanical apparatus 32, and user object 14. A similar system is described in detail in U.S. Pat. No. 5,734,373, which is hereby incorporated by reference herein in its entirety.

As explained with reference to FIG. 1, computer 18 is preferably a personal computer, workstation, video game console, or other computing or display device. Host computer system 18 commonly includes a host microprocessor 34, random access memory (RAM) 36, read-only memory (ROM) 38, input/output (I/O) electronics 40, a clock 42, a display device 20, and an audio output device 44. Host microprocessor 34 can include a variety of available microprocessors from Intel, AMD, Motorola, or other manufacturers. Microprocessor 34 can be single microprocessor chip, or can include multiple primary and/or co-processors and preferably retrieves and stores instructions and other necessary data from RAM 36 and ROM 38 as is well known to those skilled in the art. In the described embodiment, host computer system 18 can receive sensor data or a sensor signal via a bus 46 from sensors of device 12 and other information. Microprocessor 34 can receive data from bus 46 using I/O electronics 40, and can use I/O electronics to control other peripheral devices. Host computer system 18 can also output commands to interface device 12 via bus 46 to cause force feedback for the interface system 10.

Clock 42 is a standard clock crystal or equivalent component used by host computer 18 to provide timing to electrical signals used by host microprocessor 34 and other components of the computer system 18 and can be used to provide timing information that may be necessary in determining force or position values. Display device 20 is described with reference to FIG. 1. Audio output device 44, such as speakers, can be coupled to host microprocessor 34 via amplifiers, filters, and other circuitry well known to those skilled in the art. Other types of peripherals can also be coupled to host processor 34, such as storage devices (hard disk drive, CD ROM drive, floppy disk drive, etc.), printers, and other input and output devices.

Electronic interface 30 is coupled to host computer system 18 by a bi-directional bus 46. The bidirectional bus sends signals in either direction between host computer system 18 and the interface device 12. Bus 46 can be a serial interface bus, such as USB, RS-232, or Firewire (1392), providing data according to a serial communication protocol, a parallel bus using a parallel protocol, or other types of buses. An interface port of host computer system 18, such as a USB or RS232 serial interface port, connects bus 46 to host computer system 18.

Electronic interface 30 includes a local microprocessor 50, local clock 52, local memory 54, sensor interface 56, and actuator interface 58. Interface 30 may also include additional electronic components for communicating via standard protocols on bus 46. In various embodiments, electronic interface 30 can be included in mechanical apparatus 32, in host computer 18, or in its own separate housing. Different components of interface 30 can be included in device 12 or host computer 18 if desired.

Local microprocessor 50 preferably coupled to bus 46 and may be closely linked to mechanical apparatus 14 to allow quick communication with other components of the interface device. Processor 50 is considered "local" to interface device 12, where "local" herein refers to processor 50 being a separate microprocessor from any processors 34 in host computer 18. "Local" also preferably refers to processor 50 being dedicated to force feedback and sensor I/O of the interface system 10, and being closely coupled to sensors and actuators of the device 12, such as within the housing of or in a housing coupled closely to device 12. Microprocessor 50 can be provided with software instructions to wait for commands or requests from computer host 18, parse/decode the command or request, and handle/control input and output signals according to the command or request. In addition, processor 50 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 50 include the 8X930AX by Intel, the MC68HC711E9 by Motorola or the PIC16C74 by Microchip, for example. Microprocessor 50 can include one microprocessor chip, or multiple processors and/or co-processor chips. In other embodiments, microprocessor 50 can include digital signal processor (DSP) functionality.

For example, in one host-controlled embodiment that utilizes microprocessor 50, host computer 18 can provide low-level force commands over bus 46, which microprocessor 50 directly transmits to the actuators. In a different local control embodiment, host computer system 18 provides high level supervisory commands to microprocessor 50 over bus 46, and microprocessor 50 manages low level force control loops to sensors and actuators in accordance with the high level commands and independently of the host computer 18. In the local control embodiment, the microprocessor 50 can process inputted sensor signals to determine appropriate output actuator signals by following the instructions of a "force process" that may be stored in local memory 54 and includes calculation instructions, formulas, force magnitudes, or other data. The force process can command distinct force sensations, such as vibrations, textures, jolts, or even simulated interactions between displayed objects. The host can send the local processor 50 a spatial layout of objects in the graphical environment so that the microprocessor has a mapping of locations of graphical objects and can determine force interactions locally. Force feedback used in such embodiments is described in greater detail in co-pending patent application Ser. No. 08/879,296 and U.S. Pat. No. 5,734,373, both of which are incorporated by reference herein.

A local clock 52 can be coupled to the microprocessor 50 to provide timing data, similar to system clock 42 of host computer 18; the timing data might be required, for example, to compute forces output by actuators 30. Local memory 54, such as RAM and/or ROM, is preferably coupled to microprocessor 50 in interface 30 to store instructions for microprocessor 50 and store temporary and other data. Microprocessor 50 may also store calibration parameters and the state of the force feedback device in a local memory 54.

Sensor interface 56 may optionally be included in electronic interface 30 to convert sensor signals to signals that can be interpreted by the microprocessor 50 and/or host computer system 18. For example, sensor interface 56 can receive and convert signals from a digital sensor such as an encoder or from an analog sensor using an analog to digital converter (ADC). Such circuits, or equivalent circuits, are well known to those skilled in the art. Alternately, microprocessor 200 can perform these interface functions or sensor signals from the sensors can be provided directly to host computer system 18. Actuator interface 58 can be optionally connected between the actuators of device 12 and microprocessor 50 to convert signals from microprocessor 50 into signals appropriate to drive the actuators. Interface 58 can include power amplifiers, switches, digital to analog controllers (DACs), and other components well known to those skilled in the art.

Power supply 59 can optionally be coupled to actuator interface 58 and/or actuators 62 to provide electrical power. Active actuators typically require a separate power source to be driven. Power supply 59 can be included within the housing of interface device 12, or can be provided as a separate component, for example, connected by an electrical power cord. Alternatively, if the USB or a similar communication protocol is used, actuators and other components can draw power from the USB from the host computer. Active actuators, rather than passive actuators, tend to require more power than can be drawn from USB, but this restriction can be overcome in a number of ways. One way is to configure interface device 12 to appear as more than one peripheral to host computer 18; for example, each provided degree of freedom of user object 14 can be configured as a different peripheral and receive its own allocation of power. Alternatively, power from the USB can be stored and regulated by interface device 12 and thus used when needed to drive actuators 62. For example, power can be stored over time and then immediately dissipated to provide a jolt force to the user object. A capacitor circuit or battery, for example, can store the energy and dissipate the energy when enough power has been stored. This power storage embodiment can also be used in non-USB embodiments to allow a smaller power supply 59 to be used.

Mechanical apparatus 32 is coupled to electronic interface 30 and preferably includes sensors 60, actuators 62, and mechanism 64. Sensors 60 sense the position, motion, and/or other characteristics of a user object 14 along one or more degrees of freedom and provide signals to microprocessor 50 including information representative of those characteristics. Typically, a sensor 60 is provided for each degree of freedom along which object 14 can be moved, or, a single compound sensor can be used for multiple degrees of freedom. Example of sensors suitable for embodiments described herein are digital rotary optical encoders, which sense the change in position of an object about a rotational axis and provide digital signals indicative of the change in position. Linear optical encoders may similarly sense the change in position of object 14 along a linear degree of freedom. A suitable optical encoder is the "Softpot" from U.S. Digital of Vancouver, Wash. Alternatively, analog sensors such as potentiometers can be used. It is also possible to use non-contact sensors at different positions relative to mechanical apparatus 32, such as Polhemus (magnetic) sensors for detecting magnetic fields from objects, or an optical sensor such as a lateral effect photo diode having an emitter/detector pair. In addition, velocity sensors (e.g., tachometers) and/or acceleration sensors (e.g., accelerometers) can be used. Furthermore, either relative or absolute sensors can be employed.

Actuators 62 transmit forces to user object 14 in one or more directions along one or more degrees of freedom in response to signals output by microprocessor 50 and/or host computer 18, i.e., they are "computer controlled." Typically, an actuator 62 is provided for each degree of freedom along which forces are desired to be transmitted. Actuators 62 can include two types: active actuators and passive actuators. Active actuators include linear current control motors, stepper motors, pneumatic/hydraulic active actuators, a torquer (motor with limited angular range), a voice coil actuator, and other types of actuators that transmit a force to an object. Passive actuators can also be used for actuators 62, such as magnetic particle brakes, friction brakes, or pneumatic/hydraulic passive actuators, and generate a damping resistance or friction in a degree of motion. In some embodiments, all or some of sensors 60 and actuators 62 can be included together as a sensor/actuator pair transducer.

Figure 3:
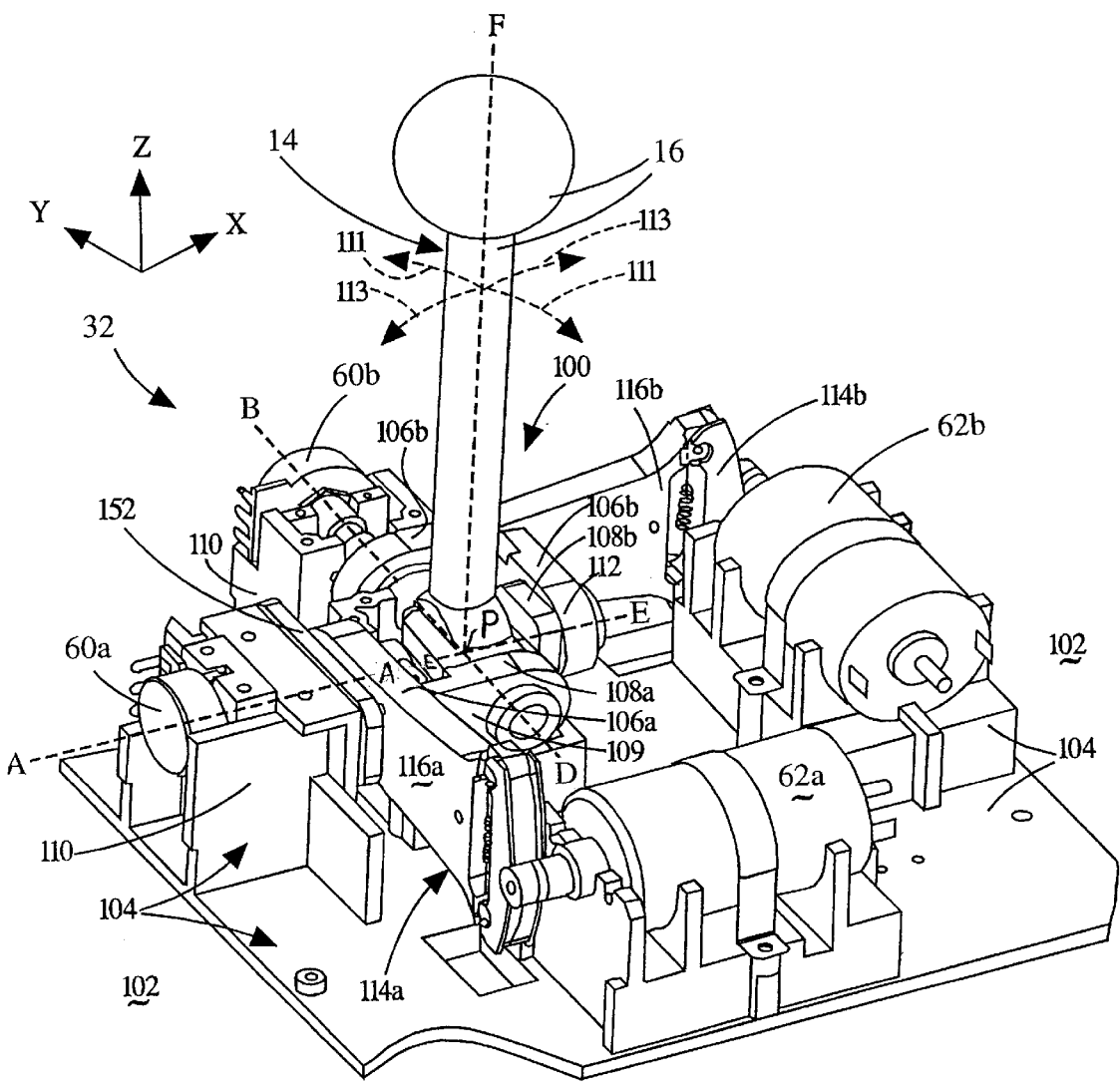
FIG. 3 is a perspective front view of a preferred embodiment of the force feedback interface device of FIG. 2.
Figure 4:
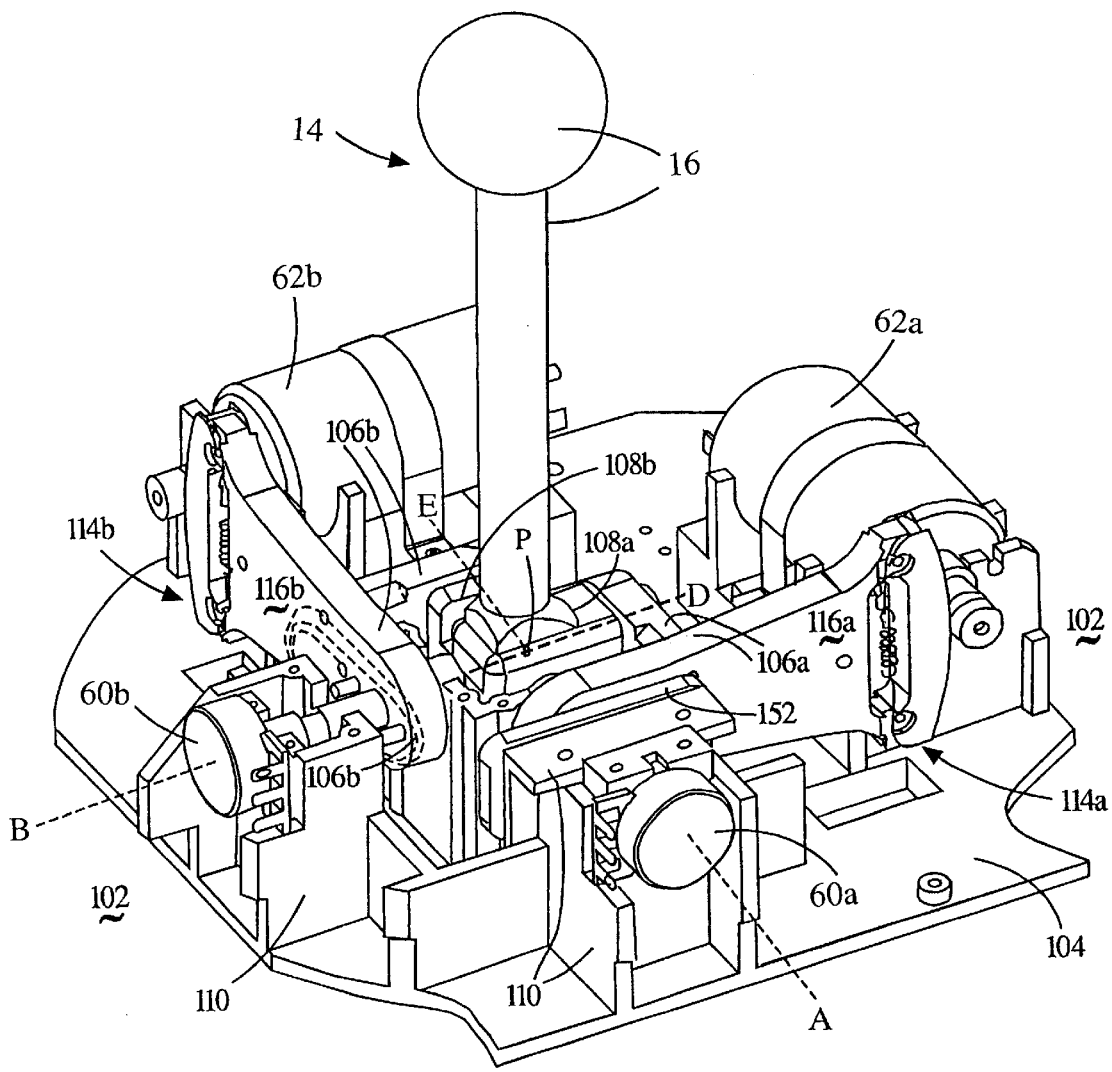
FIG. 4 is a perspective rear view of the embodiment of the force feedback interface devic of FIG. 3.

Mechanism 64 can be one of several types of mechanisms. A preferred mechanism is shown in FIGS. 3–4. Other mechanisms may also be used, such as mechanisms disclosed in U.S. Pat. Nos. 5,576,727; 5,731,804; 5,721,566; 5,767,839; 5,805,140; and 5,691,898, and co-pending patent applications Ser. Nos. 08/664,086, 08/709,012, 08/881,691, 08/961,790, and 08/965,720, all hereby incorporated by reference herein in their entirety. User object 14 can be a joystick, or other device or article coupled to mechanism 64, as described above.

Other input devices 68 can optionally be included in interface system 10 and send input signals to microprocessor 50 and/or host computer 18. Such input devices can include buttons, such as buttons on joystick handle 16, used to supplement the input from the user to a game, simulation, GUI, etc. Also, dials, switches, voice recognition hardware (with software implemented by host 18), or other input mechanisms can be used.

Safety or "deadman" switch 70 is preferably included in interface device to provide a mechanism to allow a user to override and deactivate actuators 62, or require a user to activate actuators 62, for safety reasons. For example, the user must continually activate or close safety switch 70 during manipulation of user object 14 to activate the actuators 62. If, at any time, the safety switch is deactivated (opened), power from power supply 59 is cut to actuators 62 (or the actuators are otherwise deactivated) as long as the safety switch is deactivated. Embodiments of safety switch 70 include an optical safety switch, electrostatic contact switch, hand weight safety switch, etc.

In some embodiments of interface system 10, multiple mechanical apparatuses 32 and/or electronic interfaces 30 can be coupled to a single host computer system 18 through bus 46 (or multiple buses 46) so that multiple users can simultaneously interface with the host application program (in a multi-player game or simulation, for example). In addition, multiple players can interact in the host application program with multiple interface systems 10 using networked host computers 18, as is well known to those skilled in the art.

FIGS. 3 and 4 are perspective views of one embodiment of the mechanical portion 32 and user object 14 of interface device 12 and including the features of the present invention, where these figures show orthogonal sides of the device 12. The described embodiment is a joystick apparatus including two rotary degrees of freedom, where a joystick handle 16 can be moved forward and back in one degree of freedom, and left and right in the other degree of freedom.

Mechanism 64 is provided as a gimbal mechanism 100 which couples the user object 14 to a grounded or reference surface 102. All or some of the components of gimbal mechanism 100 (and other components) can be made of metal, or, in a preferred low-cost embodiment, rigid plastic. Gimbal mechanism 100 is preferably a five-member, closed-loop parallel linkage that includes a ground member 104, extension members 106a and 106b, and central members 108a and 108b. Ground member 104 is provided as a base or planar member which provides stability for device 12 on a grounded surface 102, such as a table top, floor, desk top, or other reference surface. Ground member 104 also preferably includes upright members 110 rigidly coupled to the base portion and to which the extension members 106a and 106b are coupled. The members of gimbal mechanism 100 are rotatably coupled to one another through the use of bearings or pivots, wherein extension member 106a is rotatably coupled to ground member 104 and can rotate about an axis A, central member 108a is rotatably coupled to extension member 106a and can rotate about a floating axis D, extension member 106b is rotatably coupled to ground member 104 and can rotate about axis B, central member 108b is rotatably coupled to extension member 106b and can rotate about floating axis E, and central member 108a is rotatably coupled to central member 108b at a center point P at the intersection of axes D and E. A bearing (not shown) connects the two central members 108a and 108b together at the intersection point P. Central drive member 108a is rotatably coupled to an end 109 of extension member 106a and extends at a substantially parallel relation with axis B. Similarly, central link member 108b is rotatably coupled to an end 112 of extension member 106b and extends at a substantially parallel relation to axis A. The axes D and E are "floating" in the sense that they are not fixed in one position as are axes A and B. Axes A and B are substantially mutually perpendicular.

Gimbal mechanism 100 is formed as a five-member ("five-bar") closed chain. Each end of one member is coupled to the end of another member. The five-bar linkage is arranged such that extension member 106a, central member 108a, and central member 108b can be rotated about axis A in a first degree of freedom. The linkage is also arranged such that extension member 106b, central member 108b, and central member 108a can be rotated about axis B in a second degree of freedom. This structure is also disclosed in U.S. Pat. No. 5,731,804, which is incorporated by reference herein.

Joystick handle 16 is coupled to one of the central members 108a or 108b (member 108a in FIG. 3) of gimbal mechanism 100 such that it extends out of the plane defined by axes D and E. Gimbal mechanism 100 provides two degrees of freedom to handle 16 positioned at or near to the center point P of rotation. The handle 16 can be rotated about axis A and B or have a combination of rotational movement about these axes. Joystick handle 16 can be rotated about axis A by rotating extension member 106a, central member 108a, and central member 108b in a first revolute degree of freedom, shown as arrow line 111. Handle 16 can also be rotated about axis B by rotating extension member 106b and the two central members about axis B in a second revolute degree of freedom, shown by arrow line 113. As joystick handle 16 is moved about axis A, floating axis D varies its position, and as joystick handle 16 is moved about axis B, floating axis B varies its position.

In alternate embodiments, additional degrees of freedom can be provided. For example, the joystick handle 16 can be rotated about axis C extending perpendicularly from the plane formed by floating, axes D and E. This rotational degree of freedom can be provided with a sensor and/or an actuator to sense motion and apply forces in that degree of freedom. Additionally, a different degree of freedom can be added such that handle 16 can be linearly translated along floating axis C. This degree of freedom can also be sensed and actuated, if desired.

Gimbal mechanism 100 also includes capstan drive mechanisms 114a and 114b. In the described arrangement, a capstan drive mechanism 114 is rigidly coupled to (e.g. formed as part of) each extension member 106a and 106b. Capstan drive mechanisms 114 are included in gimbal mechanism 100 to provide mechanical advantage to the output of actuators 62 without introducing friction and backlash to the system. A capstan drum 116 of each capstan drive mechanism is rigidly coupled to a corresponding extension member 106a or 106b. Capstan drum 116a is, in effect, formed as part of extension member 106a; the portion of drum 116a that extends away from the "L" shaped portion of member 106a is considered the capstan drum portion. Thus, the capstan drum and extension member are rotated about axis A simultaneously. Likewise, extension member 106b is rigidly coupled to the other capstan drum 116b and both are simultaneously rotated about axis B. The capstan drive mechanisms 114 are described in greater detail with respect to FIG. 5.

Also preferably coupled to gimbal mechanism 100 are sensors 60 and actuators 62. Such transducers are preferably coupled at the link points between members of the apparatus and provide input to and output from the electrical system. Transducers that can be used with the present invention are described in greater detail with respect to FIG. 2. In the described embodiment, actuators 62 include two grounded actuators 62a and 62b. The housing of grounded actuator 62a is preferably coupled to ground member 104. A rotational shaft of actuator 62a is coupled to the capstan drive mechanism 114 to apply forces to the joystick handle 16 in the first degree of freedom about axis A. The capstan drive mechanism 114 is described in greater detail with respect to FIG. 5. Grounded actuator 62b preferably corresponds to grounded transducer 62a in function and operation, where actuator 62b is coupled to the ground member 104 and applies forces to the joystick handle 16 in the second revolute degree of freedom about axis B.

Actuators 62, in the described embodiment, are preferably linear current control motors, such as DC servo motors. These motors preferably receive current signals to control the direction and torque (force output) that is produced on a shaft; the control signals for the motor are produced by microprocessor 50 as explained above. The motors may include brakes which allow the rotation of the shaft to be halted in a short span of time. A suitable motor to be used as actuators 62 is HC615L6 manufactured by Johnson Electric. In alternate embodiments, other types of motors can be used, such as a stepper motor controlled with pulse width modulation of an applied voltage, or pneumatic motors, or passive actuators.

Sensors 60 are, in the described embodiment, coupled to the extension members 106a and 106b. One portion of the sensor is grounded by being coupled to ground member 104. A rotary shaft of each sensors is rigidly coupled to an associated extension member. Sensors 60 are preferably relative optical encoders which provide signals to measure the angular rotation of a shaft of the sensor. The electrical outputs of the encoders are routed to microprocessor 50 (or host computer 18) as detailed above. Other types of sensors can also be used, such as potentiometers or other analog or digital sensors as described above. It should be noted that the present invention can utilize both absolute and relative sensors.

The actuators 62 of the described embodiment are advantageously positioned to provide a very low amount of inertia to the joystick handle 16. Actuators 62 are decoupled, meaning that the transducers are both directly coupled to ground member 104 which is coupled to ground surface 102, i.e. the ground surface carries the weight of the actuators, not the joystick handle 16. The weights and inertia of the actuators 62 are thus substantially negligible to a user handling and moving handle 16. This allows more realistic forces to be transmitted to user object 14. The user feels very little compliance or "mushiness" when handling handle 16 due to the high bandwidth.

Figure 5:
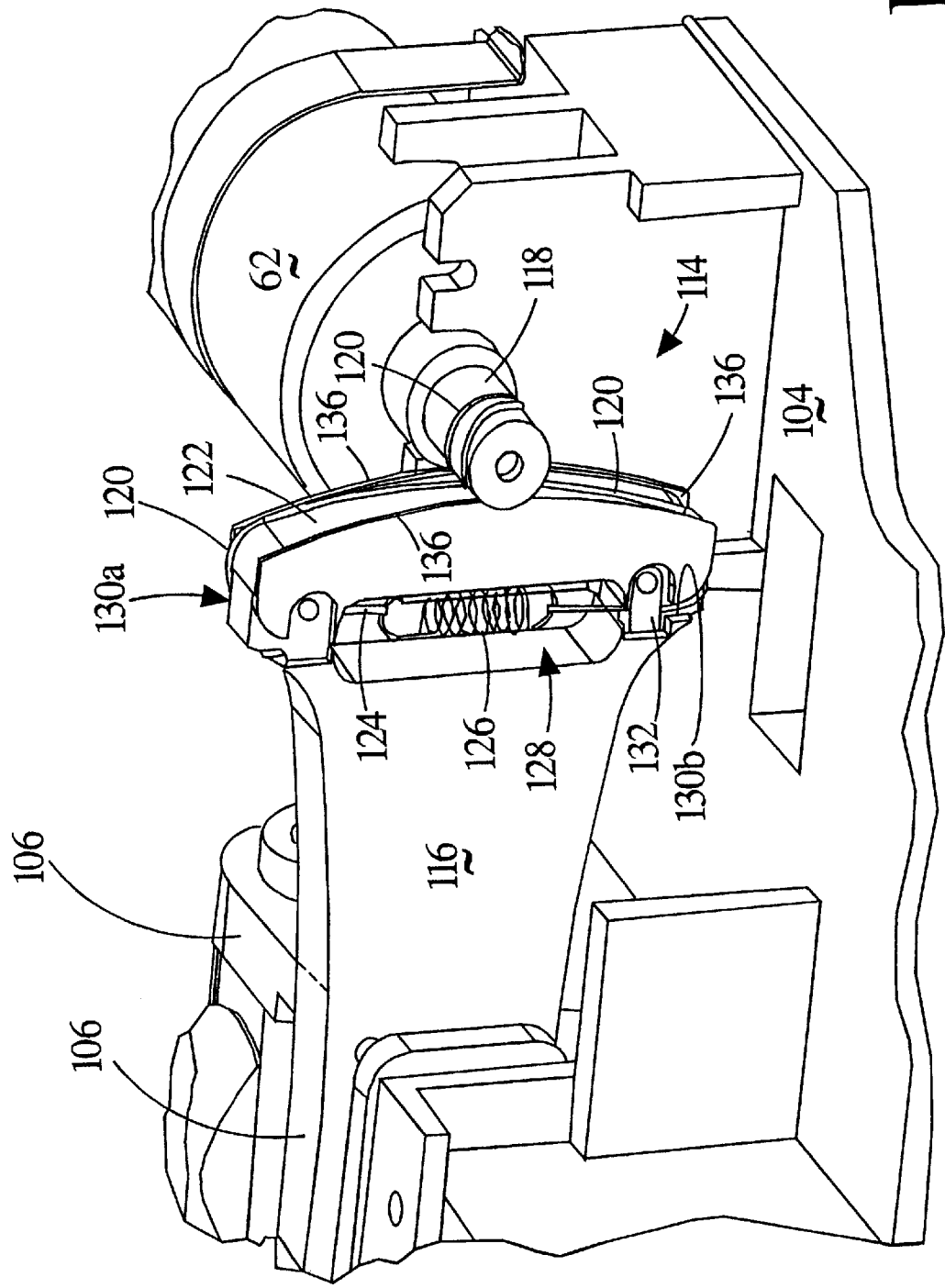
FIG. 5 is a perspective detailed view of a capstan drive mechanism of the present invention used for two degrees of freedom in the present invention.

FIG. 5 is a perspective view of a capstan drive mechanism 114 shown in greater detail. The drive mechanism 114 is coupled to extension aim 106 as shown in FIGS. 3 and 4. Each capstan drive mechanism 114a and 114b shown in FIGS. 3 and 4 is preferably implemented the same way. Capstan drive mechanism 114 includes capstan drum 116, capstan pulley 118, and cable 120. Capstan drum 116 is preferably a wedge- or other-shaped member having a curved end 122, e.g. the end 122 is a portion of the circumference a circular shape about the axis of rotation. Other shapes of drum 116 can also be used. The drum 116 is rigidly coupled to extension member 106, which is pivotally coupled to ground member 104 at axis A or B. Thus, when capstan drum 114 is rotated about axis A or B, the extension member 106 is also rotated. Curved end 122 is preferably formed in an arc centered about the axis A or B, and is preferably positioned about 0.030–0.035 inches away from pulley 118 using a 0.025 inch diameter cable 120 (this distance can vary depending on the diameter of cable 120 used).

Capstan pulley 118 is a cylindrical member positioned near the curved portion 122 of capstan drum 116. The pulley is rigidly coupled to a rotating shaft of actuator 62. In other embodiments, the pulley can be the actual driven shaft of the actuator. Cable 120 is preferably a thin metal cable connected to curved portion 122 of the capstan drum. Other types of flexible members, such as durable cables, cords, wire, thin metal bands, etc. can be used as well. A first end 124 of cable 120 is attached to a spring 126, where the spring 126 is positioned in an aperture 128 provided in the capstan drum 116. The cable is routed from the first end 124, through a guide 130a on the capstan drum, and tautly over a portion of the curved end 122. The cable is then routed a number of times around pulley 118; for example, the cable is wound twice around the pulley in the shown example. The cable is then again drawn tautly against curved end 122, is routed through a guide 130b of the capstan drum, and is attached to the other end of spring 126. In alternate embodiments, the cable 120 can be firmly attached to the capstan drum 116 rather than spring 126; however, certain advantages are obtained by using spring 126, as described below. The spring 126 can be attached to the cable in a variety of assembly methods; for example, the cable can be first routed around the drum 116, and a tool can be used to extend the spring to allow the second end of the cable to be attached to the spring. Or, the cable is routed around its path but not around the drum, the motor is cocked at an angle, the cable is wrapped around the drum, and the motor is straightened to tighten the cable around the drum.

The actuator 62 rotates pulley 118 to move the cable 120 that is tightly wound on the pulley (the tension in cable 120 provides the grip between cable and pulley). As pulley 118 is rotated by an actuator 62 (or as the drum 116 is rotated by the manipulations of the user), a portion of cable 118 wrapped around the pulley travels closer to or further from actuator 62, depending on the direction that pulley 118 rotates. The cable 120 transmits rotational force from the actuator-driven pulley 118 to the capstan drum 116, causing capstan drum 116 to rotate about axis A or B. This provides rotational force on the extension member 106 and the handle 16 in the associated degree of freedom. It should be noted that pulley 118, capstan drum 116 and extension member 106 will only actually rotate in space if the user is not applying the same or greater amount of rotational force to handle 16 in the opposite direction to cancel the rotational movement. In any event, the user will feel the rotational force along the associated degree of freedom on handle 16 as force feedback.

Figure 6A:
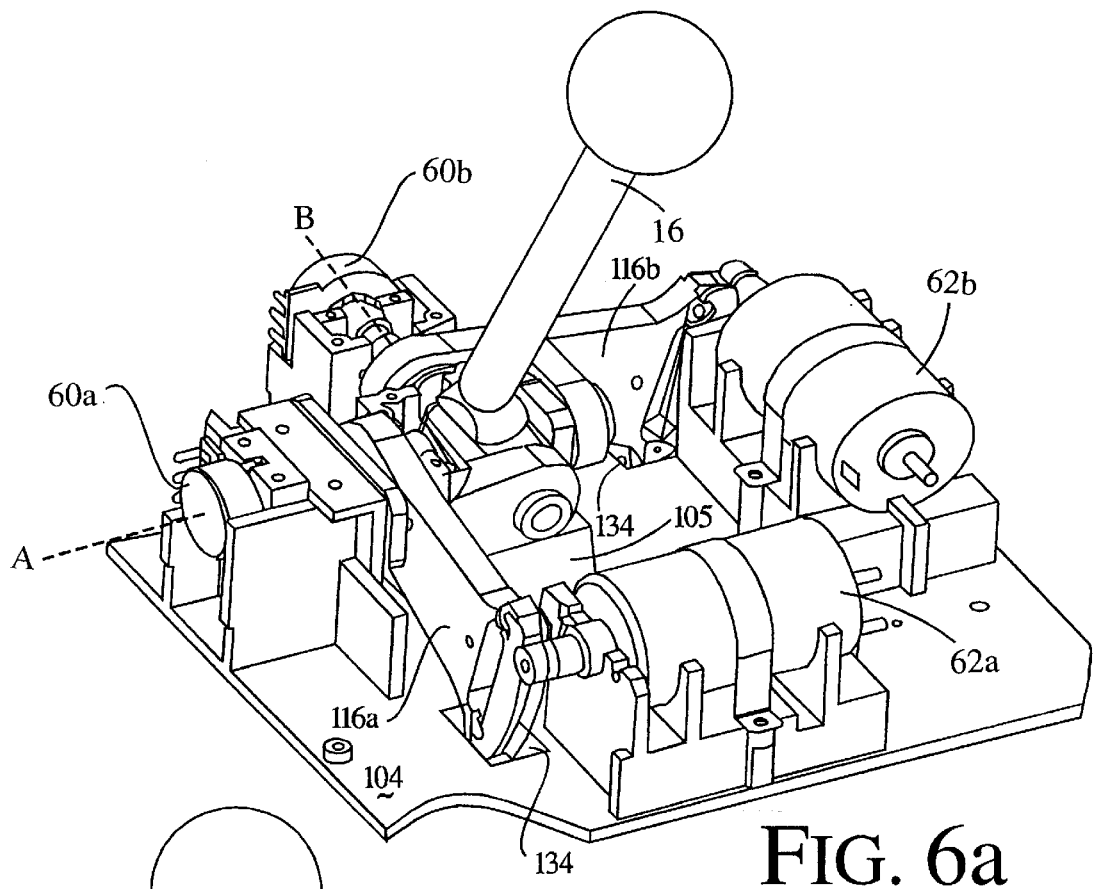
FIGS. 6a and 6b are perspective views of the force feedback interface device of FIG. 3 showing the range of motion of the handle.
Figure 6B:
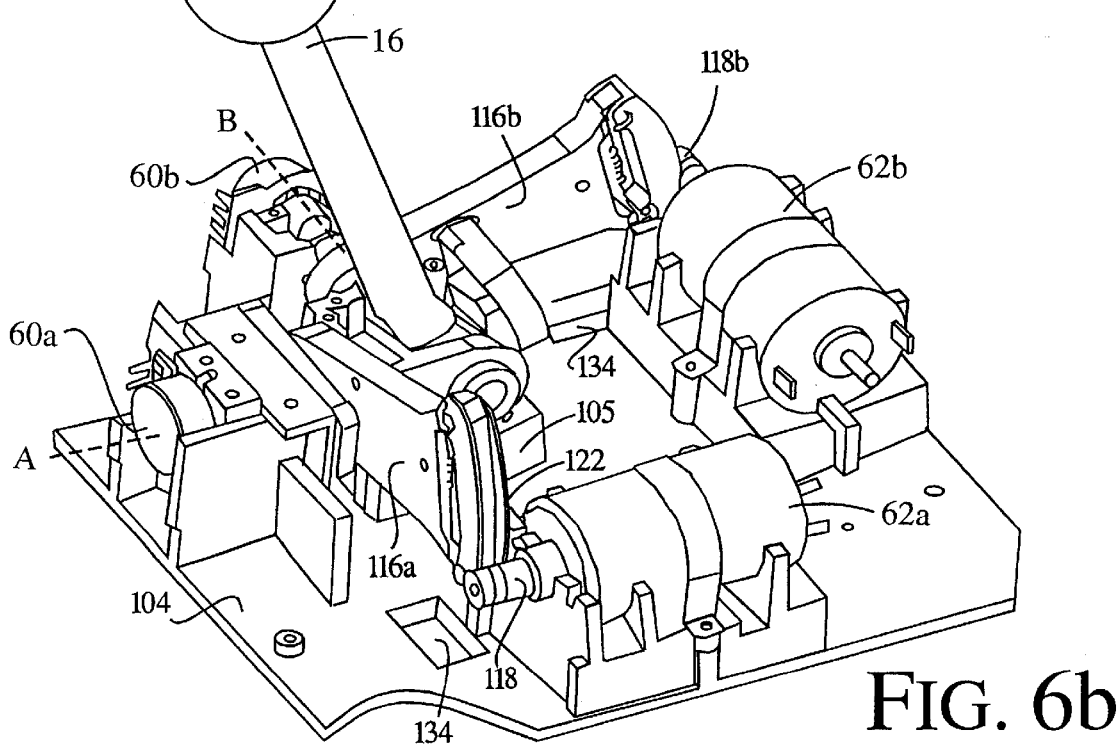

For example, FIGS. 6a and 6b demonstrate the motion of the capstan drums 116a and 116b and the corresponding motion of joystick handle 16. In FIG. 6a, the handle 16 has been moved diagonally in one direction (e.g., down-right) to permissible limits, and the capstan drums 116 have correspondingly been rotated toward ground member 104 (note that this movement can be caused by the user moving handle 16 or by actuators 62 rotating pulley 118). A hole or depression 134 can be provided in the surface of ground member 104 under each capstan drum 116a and 116b to allow the capstan drums to move to a desired rotational limit. Such a hole may not be necessary in implementations that position the axis of rotation of the capstan drums at a far enough distance away from the ground member 104. The ground member 104 also acts as a stop in the described embodiment. A fence 105 is coupled to the ground member 104 and is provided as four walls that extend up from the surface of the ground member surrounding an extension (not shown) of handle 16. The extension extends down in the center of the fence 105 so that when the handle 16 is moved in any of the four directions or a combination of directions (e.g. diagonally), the handle extension impacts one side of the fence 105 and prevents further rotation in that direction. The fence 105 thus is a stop that constrains the movement of handle 16 to a desired angular range. This impact with fence 105 occurs before the capstan drums 116a and 16b impact the ground member 104, thus preventing a large load and/or damage to the capstan drums which might occur if the capstan drums were allowed to impact a hard stop.

In FIG. 6b, the handle 16 has been moved diagonally to the opposite direction to that shown in FIG. 6a, e.g. to the upper-left. The capstan drums 116a and 116b are correspondingly rotated away from the ground member 104. As described above, fence 105 functions as a stop to the movement of the handle 15, so that the handle and capstan drums may not be rotated further than shown in FIG. 6b. Thus, the fence 105 constrains the drums to an angular range defined by the dimensions of the fence 105 and the handle extension into the fence. If the handle is to be moved in only one direction (e.g., up or right), then only the capstan drum 116 that corresponds to that axis of rotation is rotated.

The described embodiment of the present invention also is preferably used with an automatic sensor calibration procedure to determine the limits to the range of motion of manipulandum 16, which is used to determine the position of the manipulandum 16 in its degrees of freedom. Although fence 105 provides a hard stop to limit the range of motion of handle 16 and thus provides a sensing range limit for sensors 60, some inaccuracies to the sensed range can still occur, especially based on manufacturing variances between devices. In a preferred embodiment, a dynamic calibration procedure is used, where the sensing range of the device is determined dynamically for a particular device based on the range of motion of the handle sensed up to the current point in time. Thus, the limits (minimum and maximum sensor range values) that have been detected so far in each degree of freedom are considered to be the limits of the motion of the handle, and these limits are increased as the handle is moved closer to the actual physical limits over time (and more extreme sensor values are read). The sensing range eventually extends to the actual physical limits of the sensing range as the handle is moved to its limits during operation of the device as defined by fence 105. At any time, the current sensor range is normalized to a standard range of values that the host computer expects to receive. Such a procedure is also described in co-pending patent application Ser. No. 08/970,953, incorporated by reference herein.

A problem can occur in the dynamic calibration of the sensors due to flex or slop in the transmission system or other components of the device, especially if the transmission system includes components made of at least a partially flexible material such as plastic (plastic components are often desirable for high-volume mass market devices). Since actuator forces may often be output in the same direction as the physical stop, the actuator forces can stress the transmission system so that one or more components in the transmission system move an additional amount while handle 16 is stopped by a fence 105 limit. The limits to the sensed range will be then be considered greater than when no forces are output, causing inaccuracies in the sensed position of the manipulandum.

For example, in the present invention, the handle 16 may be stopped by fence 105, but capstan drums 116 may be moved a small distance in their rotatable range past their corresponding limits by the actuator forces while the handle 16 remains stationary, i.e. the capstans are forced to continue to move relative to the handle due to flex in the system. Since, in the described configuration, the sensors 60 sense motion of the capstan drums 116 instead of handle 16 directly, the handle will appear to have moved when only the capstan drums have moved. However, when the handle is moved to a limit while no actuator forces are applied in that direction, the casptan drums are not stressed past their limits and have no extra movement with respect to the handle 16, so that the fence 105 is the sensed limit. Thus, the limits to the sensed range will be greater when actuator forces are output than when no forces are output; and since the dynamic calibration procedure takes the greatest (maximum or minimum) sensed value as the sensor range limit, this limit will present a problem when no actuator forces are applied. The user will move the handle to a limit, but the microprocessor 90 or host computer 18 will not read that position as being at a limit since the dynamic calibration procedure indicated that there is a greater sensing range. This leads to inaccuracies in the sensed position of the handle; for example, the user will not be able to control a graphical object to move to a limit on the screen even though the handle 16 is at a physical limit.

To prevent detecting such a "false" limit caused by an actuator overstressing the transmission system, the calibration procedure used in the present invention preferably only reads new sensor range limits when the actuator is not outputting a force in the direction of that limit. For example, the calibration procedure is preferably performed by instructions implemented by microprocessor 90 (or, alternatively, host computer 18) and is running during the normal operation of the force feedback device. The calibration procedure receives all sensor readings output by the sensors 60. The procedure checks if the sensor reading is greater than the maximum sensor value previously read (as determined from previous sensor readings), or if it is less than the minimum sensor value previously read. If neither is true, the sensor value is ignored by the calibration procedure. If the sensor value is greater than the maximum or less than the minimum, the procedure checks whether the sensor value was read during the output of any component of force by actuators 62 in the direction of the limit applicable to that sensor value. If so, then the calibration procedure ignores the sensor value since the actuator force may have stressed the transmission system past the physical limits provided when no actuator force is output. If no forces were output toward that limit, then that value becomes the new maximum or minimum in the sensed range. Thus, the calibration procedure only includes new maximum or minimum sensor values in the sensor range that are free from the influence of the actuator forces, so that the sensor range never extends past the range provided when no actuator forces are output.

Referring back to FIG. 5, the tension in cable 120 should be provided at a level so that the cable 120 adequately grips the pulley 118 without slipping when the pulley is rotated, and also to provide negligible backlash or play between capstan drum 116 and pulley 118. Thus, the cable 120 preferably has a high degree of tension. In the present invention, the cable 120 is tensioned by spring 126, which couples both ends of the cable together. Cable 120 in the present invention is preferably rigidly attached to the capstan drum 116 at anchor points by clamp 132 (preferably provided at either guide 130*a* or guide 130*b*). Clamp 132 secures the cable 120 to the drum 116 using friction to prevent the cable 120 from moving or slipping with respect to the drum. Thus, spring 126 pulls both ends of the cable toward each other from opposite directions to tension the cable, while the clamp 132 anchors the cable to the drum.

When the cable 120 is installed, the cable is provided with enough tension so that spring 126 is partially tensioned. In previous systems, the cable was typically attached directly to a capstan drum and tensioned by rotating a screw, pulling more cable through a holding device, or by some other manual adjustment. That procedure significantly added to the production costs of the device, since each cable in each device had to manually adjusted to a proper tension. In addition, as a cable became loose over time in previous systems and introduced slack due to motion and transmission of forces, an operator or user had to manually re-tension the cables. Spring 126, in contrast, is a self-tensioning device that automatically provides the desired tension in the cable without any need for manual adjustment, and does not allow slack to be introduced so that the cable does not become loose over time. Since the ends of the cable are attached to spring 126, the spring force draws the cable tautly together and the tension in the cable is properly maintained. Furthermore, since the ends of the cable are not attached to the drum 116, there is no tendency for the drum material to flex or "creep" over time due to the high cable forces. This advantage is most clear when the drums 116 are made of a material such as plastic, which is most appropriate for high volume, low cost production; since plastic tends to creep over time, the cable being attached to a metal spring 126 rather than the drum 116 is highly advantageous.

In other embodiments, such as the capstan mechanism disclosed in co-pending parent patent application Ser. No. 08/961,790 (Atty Docket No. IMM1P033), only one end of the cable is attached to the spring 126, while the other end is securely anchored to the capstan drum 116. However, unlike the above embodiment having two ends attached to the spring, this embodiment has the disadvantage that the material of the drum may flex or creep at the cable end directly attached to the drum, especially when plastic or other softer materials are used for drum 116.

A different improvement of the present invention to the capstan drive mechanism is the provision of flanges 136 on the curved end 122 of capstan drums 116. Flanges 136 are small raised portions at the lengthwise edges of the curved end 122 which function to prevent the cable 120 from slipping off the end 122 of the drum as the capstan drum is rotated. This can be helpful in preventing a major mechanical malfunction of the device if the capstan should happen to rotate too far, where the cable may tend to migrate off one side of the drum and pulley; the flanges can prevent this by prevent cable motion to the sides of the drum and to prevent the cable from escaping between the drum and the pulley. In addition, the flanges 136 ease the assembly process when wrapping the cable on the capstan drum and capstan pulley, since the cable is less likely to slip off the drum during the assembly or winding process. The curved end of the capstan drum 116 can also be grooved in alternate embodiments to further help in guiding the cable and preventing the cable from slipping off the capstan drum.

The capstan mechanism 114 provides a mechanical advantage to the output forces of actuators 62 so that the force output of the actuators is increased. The ratio of the diameter of pulley 118 to the diameter of capstan drum 116 (i.e. double the distance from associated axis of rotation to the curved end of capstan drum 116) dictates the amount of mechanical advantage, similar to a gear system. In the preferred embodiment, the ratio of drum to pulley is equal to 17:1, although other ratios can be used in other embodiments.

Alternatively, the pulley 118 can include guides, such as threads similar to a screw. The threads can function to help guide the cable along the pulley as the pulley rotates and to provide cable 120 with a better grip on pulley 118. Cable 120 can be positioned between the threads.

In the present embodiment, the sensors 60 are only indirectly coupled to the capstan drive mechanism 114 since the rotation of extension members 116 is directly sensed. However, in an alternate embodiment, each sensor can be coupled to a pulley 118 to measure the rotation of the pulleys. Cable 120 would then also transmit rotational motion from drum 116, as initiated by a user on handle 16, to the pulley 118 and sensor 62. Such an embodiment has the advantage of increasing sensor accuracy since the pulley rotates a greater number of times for each rotation of the extension member, and a greater resolution is achieved. Since little or no backlash is present using the capstan drive mechanism, this sensing is also quite accurate.

Capstan drive mechanism 114 is advantageously used in the present invention to provide transmission of forces and mechanical advantage between actuators 62 and joystick handle 16 without introducing substantial compliance, friction, or backlash to the system. A capstan drive provides increased stiffness, so that forces are transmitted with negligible stretch and compression of the components. The amount of friction is also reduced with a capstan drive mechanism so that substantially "noiseless" forces can be provided to the user. In addition, the amount of backlash contributed by a capstan drive is also negligible. "Backlash" is the amount of play that occurs between two coupled rotating objects in a gear or pulley system. Two gears, belts, or other types of drive mechanisms could also be used in place of capstan drive mechanism 114 in alternate embodiments to transmit forces between an actuator 62 and extension member 106. However, gears and the like typically introduce some backlash in the system, and a user might be able to feel the interlocking and grinding of gear teeth during rotation of gears when manipulating handle 16.

Figure 7:
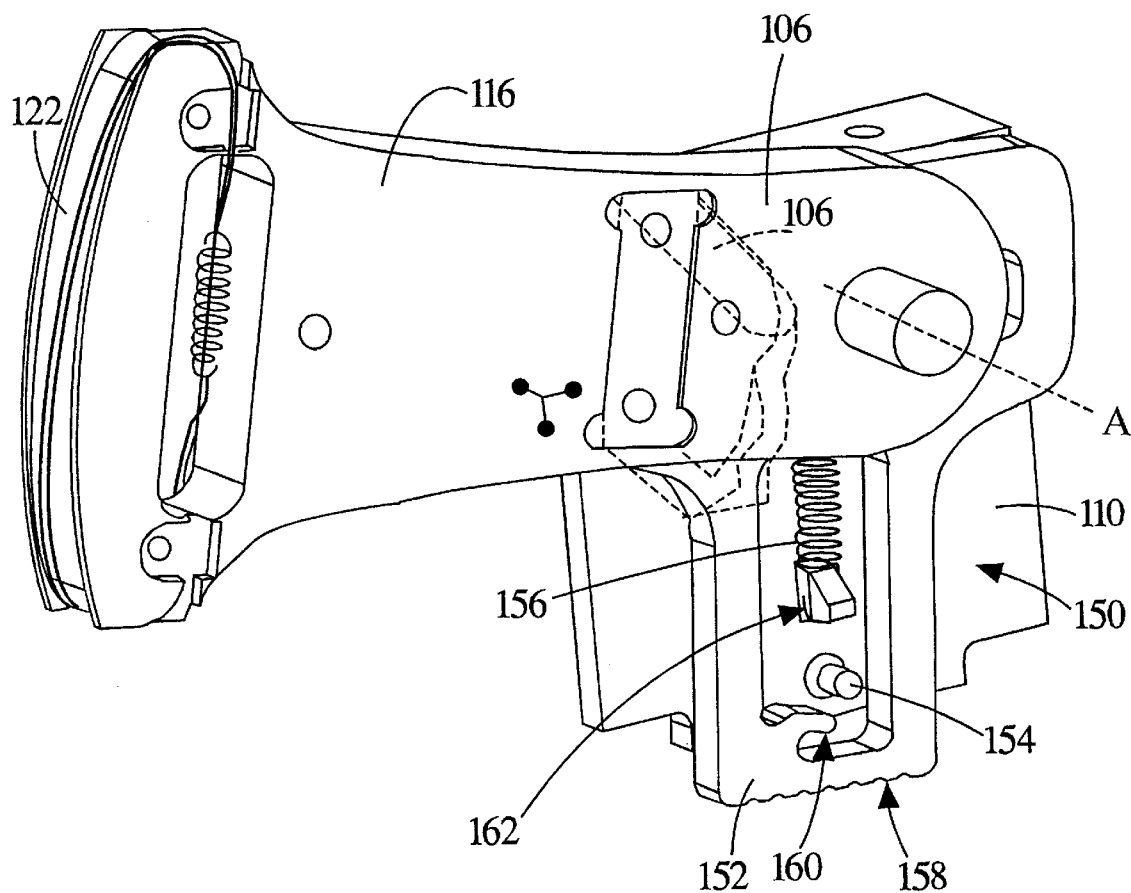
FIG. 7 is a perspective view of a releasable spring mechanism of the present invention.

FIG. 7 is a perspective view of a releasable spring mechanism of the present invention. This mechanism allows physical springs to be selectively coupled to the rotating members of gimbal mechanism 100 to bias the members about their rotational axes of motion to a desired position when the user is not exerting force on handle 16, such as to place the joystick handle 16 in a central upright position. When the interface device is desired to be powered and forces applied, the physical springs can be disconnected from the gimbal mechanism to allow the forces to be applied without interference. A spring mechanism 150 is preferably provided for both degrees of freedom of interface device 14 in which forces are applied (only one spring mechanism, for axis A, is shown in FIGS. 3 and 4).

Releasable spring mechanism 150 includes a moveable catch member 152, a grounded catch member 154, and a spring 156. Moveable catch member 152 (also shown between extension member 106a and grounded upright member 110 in FIG. 4) is moved by the user to connect or disconnect the spring 156 from the gimbal mechanism. In the described embodiment, an aperture is provided in ground member 104 so that a grip portion 158 of the member 152 may extend through the bottom of the interface device 14 to allow a user to move the member 152. The catch member 152 is moved by a user to engage or disengage grounded catch member 154, which in the described embodiment is a peg or similar member coupled to grounded upright member 110. A latch 160 of the catch member 152 may receive catch member 154 when the user moves the catch member 152 in the appropriate fashion, as described below.

Figure 8:
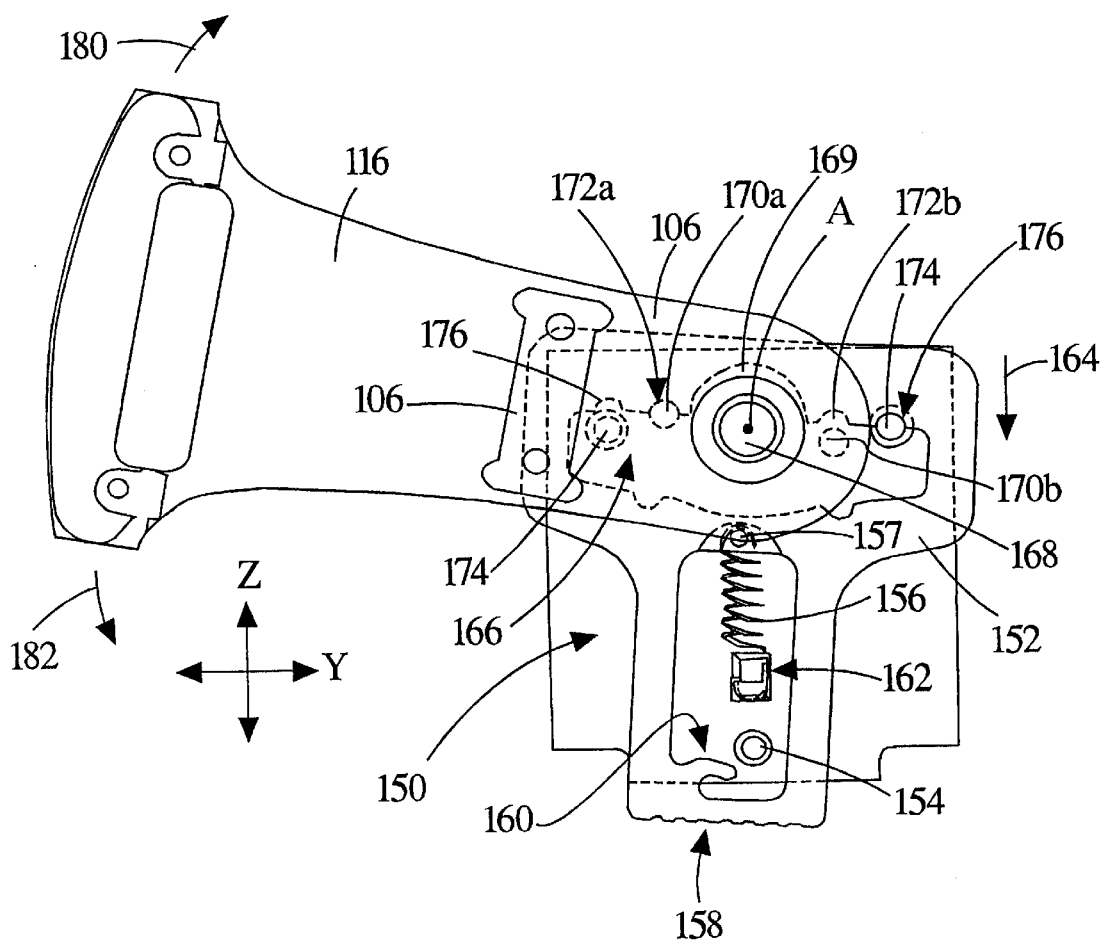
FIG. 8 is a side elevation view of the releasable spring mechanism in an engaged position.
Figure 9:
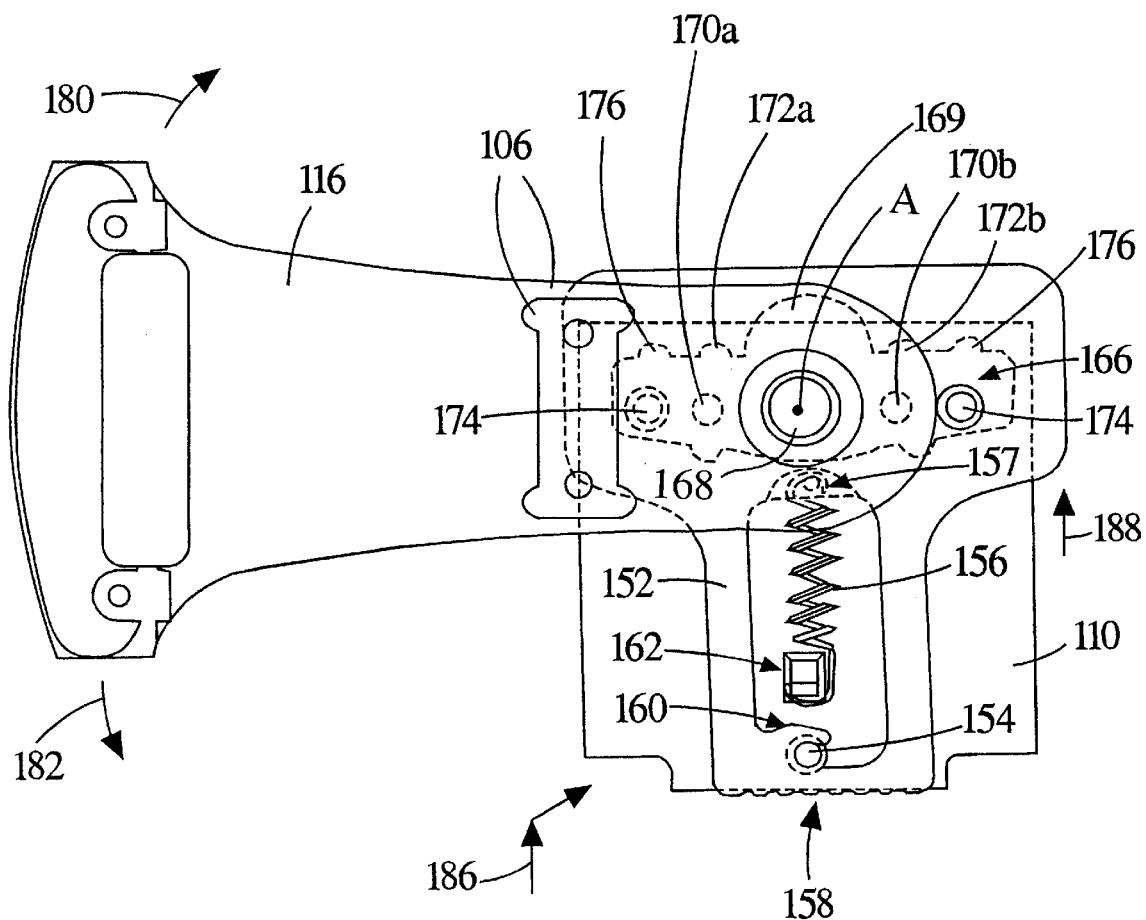
FIG. 9 is a side elevation view of the releasable spring mechanism in a disengaged position.

Spring 156 is coupled at one end 162 to grounded upright member 110 (which is part of grounded member 104) and is coupled at its other end 157 to moveable catch member 152 (shown in FIGS. 8 and 9). Spring 156 functions, when coupled to the extension member, to apply a spring force to the gimbal mechanism and center the joystick handle about the axis associated with the extension member 116 to which the mechanism 150 is coupled (axis A in FIG. 7). Spring 156 does not apply any spring force to the gimbal mechanism when the spring is disengaged, as described below.

In the preferred embodiment, the releasable spring mechanism 150 provides a preload condition that ensures the handle 16 is biased in a completely upright position when the springs are engaged. The springs 156 are preloaded by stretching them so that a spring force is applied to the handle even when in an upright center position. This causes a higher spring return force to be applied to the handle 16 even after only a small deflection from the upright center position (or other desired position). This preload condition prevents the handle 16 from resting at slightly off-center positions caused by a weak spring force at small handle deflections.

FIG. 8 is a side elevation view of releasable spring mechanism 150 in its engaged position, i.e., where spring 156 is engaged with the gimbal mechanism to provide a centering spring force on the joystick handle 16 in the associated axis of motion. In this position, the latch 160 has not been engaged with catch member 154. This allows the catch member 152 to be pulled in the direction of arrow 164 toward the grounded catch member 162 because of the spring force in that direction contributed by spring 156.

Moveable catch member 152 preferably includes a central aperture 166 through which the bearing portion 168 extends. Catch member 152 includes a central receptacle 169 on the edge of the aperture 166 and shaped so that the catch member 152 has clearance from the bearing portion 168. Furthermore, the extension member 106 includes pegs 170 which are rigidly coupled to the extension member 106 and which extend into the aperture 166 of the catch member 152. Catch member 152 includes receptacles 172 on the edge of aperture 166 which are shaped to receive the pegs 170. Furthermore, grounded member 110 includes grounded pegs 174 which also extend into the central aperture 166 of the catch member 152. Catch member 152 includes receptacles 176 on the edge of aperture 166 and shaped to receive the pegs 174.

In the engaged position, the catch member 152 is pulled toward catch member 162, which causes the receptacles 176 to engage grounded pegs 174 in the direction of arrow 164 and prevents the catch member 152 from moving further towards catch member 162. In this position, when extension member 106 is horizontally oriented along axis y, the pegs 170 coupled to extension member 106 are substantially engaged with receptacles 172. When the extension member 106 (and capstan drum 116) is moved in a direction about axis A shown by arrow 180, as shown in FIG. 8, then the peg 170a is forced against the receptacle 172a and the peg 170b is moved away from receptacle 172b. This causes the catch member 152 to move in a direction approximately opposite to arrow 164, which is against the direction of spring force. Thus, the extension member 106 is biased with the spring to return to its horizontal position. Similarly, when the extension member 106 is moved (not shown) in a direction about axis A shown by arrow 182, then the peg 170b is forced against the receptacle 172b and the peg 170a is moved away from receptacle 172a. This again causes the catch member 152 to move in a direction approximately opposite to arrow 164, providing a spring force on extension member 106 and biasing the extension member to return to its horizontal position.

The weight of the capstan drums 116 and extension members 106 may cause the spring return force to be asymmetric, i.e., if the same spring force is used to force the member 106/drum 116 down to the center position as is used to force the member 106/drum 116 up to the center position, the member/drum will not be forced by the same amount since the spring force up has to overcome the weight of the member/drum (gravity) while the spring force down is assisted by the weight of the member/drum. This asymmetry can be compensated for by repositioning the pins 170 about axis A so that a greater amount of spring deflection is provided when the member/drum rotates down, thereby providing a greater spring force when the member/drum is returned up to the center position in comparison to the spring force provided when moving the member/drum down to the center position. This can be accomplished, for example, by positioning pin 170b further from axis A than pin 170a.

In sum, the engaged mode of the mechanism 150 provides a spring force on extension member 106 in both of its directions about axis A that biases the extension member and thus the joystick handle 16 to a predetermined position. In the described embodiment, the predetermined position is approximately the center position of the degree of freedom. In other embodiments, the spring force can bias the handle 16 to a different desired predetermined position (e.g. an upright position of handle 16 may not be the center of a degree of freedom in some embodiments). This spring force prevents the joystick handle from leaning to one side when forces are not being exerted by the actuators 62 and when no external forces (such as from the user) are applied to the handle. This can be useful in situations where the joystick is being displayed and/or tested (e.g. by prospective consumers) when the joystick is not powered. For example, many stores wish to provide joystick demonstration models for consumers to try out, determine how the joystick handle feels, etc. The demonstration models typically are not powered, and without power the joystick handles tilt to one side, giving the undesired appearance of a faulty or broken joystick. The springs 156 center the handle 16 in its workspace so that the handle is in an upright position (or other desired position) to prevent this undesired appearance. In addition, when trying an unpowered demonstration force feedback joystick or other force feedback interface device, the user does not get any sense of how the device feels when powered. The springs mechanism 150 of the present invention provides an approximation of a centering force that provides the user with at least an indication of how the joystick feels when it is in normal operation with centering forces applied.

FIG. 9 is a side elevation view of releasable spring mechanism 150 in a disengaged position, i.e., where the springs 156 have been disengaged from the members of the gimbal mechanism to allow free movement of the joystick handle 16. In this position, the user has pushed the moveable catch member 152 to be engaged with grounded catch member 154. Preferably, the user pushes on grip 158 in the directions indicated by arrows 186 to engage these catch members 154 and 160. In other embodiments, different mechanisms can be provided that allow the user to move mechanism 150 into the disengaged position, such as a button or lever which performs the same engagement, or an automatic system that allows the host computer or microprocessor 50 to put the device in the engaged or disengaged position (using a solenoid or other actuator, for example).

In the disengaged position of FIG. 9, the moveable catch member 152 has been forced in a direction indicated by arrow 188 to the position shown in FIG. 9; the member 152 is locked in this position by the latch 160. This position stretches spring 156 and causes the central aperture 166 of catch member 152 to move in direction 188 relative to pegs 170 and pegs 174. Thus, the receptacles 172 and 176 are provided in a position some distance away from pegs 170 and 174, i.e. the pegs 170 and 174 are now in a more central position within aperture 166. This allows the member 106 to move freely within the space of aperture 166, i.e. when the member 106 moves in a direction 180 or 182, the pegs 170a and 170b are able to move within aperture 166 without engaging receptacles 172a and 172b. No spring bias is therefore placed on the member 106 as it moves. The handle 16 (and thus the capstan drum 116) preferably encounters a hard stop in its motion before any of the pegs 170 engage the catch member 152.

Having no mechanical spring forces present on the members of the gimbal mechanism is important when outputting forces on the gimbal mechanism 100. When interface device 14 is powered, actuators 62 may apply forces to members 106 to cause any of a variety of force sensations to the user grasping joystick handle 16, as explained above. Any forces applied by physical springs 156 would greatly interfere with forces generated by actuators 62, thus decreasing the fidelity and realism of any generated force sensations. In addition, forces from physical springs 156 are not needed to center handle 16 when the joystick is powered because the microprocessor 50 can control actuators 62 to output simulated spring forces on the members 106 to center the joystick in its workspace. Thus, even if the user does not want forces generated on the joystick, the actuators 62 can be used to apply centering spring forces equivalent to those normally provided by physical springs in non-force feedback joysticks.

While this invention has been described in terms of several preferred embodiments, it is contemplated that alterations, modifications and permutations thereof will become apparent to those skilled in the art upon a reading of the specification and study of the drawings. For example, the mechanical portion of the interface can take a variety of forms, including the closed loop linkage described herein, a mechanism having linearly-moving members, a slotted bail mechanism, or other mechanisms. Likewise, other types of mechanisms can be provided for disengaging and engaging the physical springs of the interface device with the moving mechanical members. In addition, the sensors and actuators used can take a variety of forms. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A mechanism for providing selective engagement of spring members to a user manipulatable object in a force feedback interface device coupled to a host computer, the mechanism comprising:

a grounded member coupled to a ground;

a moveable member included in a force feedback mechanism, said moveable member moveable in a degree of freedom by an actuator and transmitting forces to said user manipulatable object of said force feedback interface device;

a spring member operative to be selectively coupled and selectively decoupled between said grounded member and said moveable member; and a catch mechanism coupled to said spring member, said catch mechanism including a first catch member coupled to a first end of said spring member and a second catch member that is coupled between said grounded member and a second end of said spring member, wherein said first catch member may be selectively engaged and selectively disengaged with said second catch member to selectively couple and decouple said spring member.

2. A mechanism as recited in claim 1 wherein said spring member provides a spring force on said moveable member that biases said user manipulatable object to a predetermined position in said degree of freedom.

3. A mechanism as recited in claim 2 wherein said spring force approximately centers said user manipulatable object in said degree of freedom.

4. A mechanism as recited in claim 1 wherein said first catch member engages a portion of said moving member.

5. A mechanism as recited in claim 1 wherein said first catch member includes at least one receptacle for receiving at least one peg coupled to said moveable member, wherein when said spring member is engaged with said force feedback mechanism, said peg engages said receptacle when said moveable member is moved and is biased by said spring member, and when said spring member is disengaged with said force feedback mechanism, said peg does not engage said receptacle when said moveable member is moved.

6. A mechanism as recited in claim 1 wherein said first catch member is moveable by a user of said interface device to selectively engage said spring members with said force feedback mechanism.

7. A mechanism as recited in claim 6 wherein a portion of said first catch member extends through an opening in a housing of said force feedback interface device for access by said user.

8. A mechanism as recited in claim 1 wherein said moveable member is rotatable about an axis of rotation.

9. A mechanism as recited in claim 8 wherein said first catch member includes an aperture and wherein said moveable member includes two pegs, wherein each of said pegs extends through said aperture on opposite sides of said axis of rotation, and wherein one of said pegs engages said first catch member when said moveable member is rotated, thereby exerting a spring force from said spring member on said moveable member.

10. A mechanism as recited in claim 9 wherein when said spring member is decoupled between said grounded member and said moveable member, neither of said pegs engages said first catch member when said moveable member is moved.

11. A mechanism as recited in claim 10 wherein said first catch member includes a latch for engaging said second catch member, thereby locking said first catch member in a position such that neither of said pegs engages said first catch member when said moveable member is moved.

12. A mechanism as recited in claim 2 wherein said spring member is preloaded when said user manipulatable object is positioned at said predetermined position.

13. A force feedback interface device for providing forces on a user manipulating said interface device when coupled to a host computer, said force feedback interface device comprising:
- a user manipulandum for physical contact by a user;
- a sensor for detecting a position of said user manipulandum in a degree of freedom;
- an actuator coupled to said user manipulandum for applying a force to said user manipulandum;
- a linkage mechanism coupled between said actuator and said user manipulandum, said linkage mechanism providing said degree of freedom and transmitting said force from said actuator to said user manipulandum; and
- a spring selection mechanism coupled to said linkage mechanism and selectively allowing a spring force to be applied on said user manipulandum, said spring selection mechanism comprising:
  - a physical spring; and
  - a catch mechanism coupled to said physical spring, said catch mechanism including a first catch member coupled to a first end of said spring and a second catch member that is coupled between a grounded surface and a second end of said spring, wherein said first catch member may be selectively engaged and selectively disengaged with said second catch member to selectively allow said spring to be coupled to said linkage mechanism.

14. A force feedback interface device as recited in claim 13 wherein said first catch member is coupled between a moveable member of said linkage mechanism and said spring when said first catch member is disengaged from said second catch member.

15. A force feedback interface device as recited in claim 14 wherein said first catch member is coupled between said spring and said second catch member when said first catch member is engaged with said second catch member.

16. A force feedback interface device as recited in claim 15 wherein a moveable member of said linkage mechanism is rotatable about an axis of rotation and wherein said first catch member includes an aperture and said moveable member includes two pegs, wherein each of said pegs extends through said aperture on opposite sides of said axis of rotation, and wherein one of said pegs engages said first catch member when said moveable member is rotated, thereby exerting a spring force from said spring member on said moveable member.

17. A force feedback interface device as recited in claim 13 wherein said spring provides a spring force that approximately centers said user manipulandum in said degree of freedom.

18. A force feedback interface device as recited in claim 17 wherein said actuator is a first actuator, and further comprising a second actuator, wherein a first member of said linkage mechanism is coupled between said first actuator and said user manipulandum and a second member of said linkage mechanism is coupled between said second actuator and said user manipulandum.

19. A force feedback interface device as recited in claim 18 wherein said spring selection mechanism is a first spring selection mechanism coupled to said first member, and further comprising a second spring selection mechanism coupled to said second member.

20. A force feedback interface device as recited in claim 13 further comprising a capstan drive mechanism coupled between said actuator and said linkage mechanism, wherein said capstan drive mechanism includes a capstan pulley coupled to said actuator, a capstan drum coupled to said linkage mechanism, and a cable coupling said capstan pulley to said capstan drum.

21. A force feedback interface device as recited in claim 20 wherein said capstan drum includes a tensioning spring member coupled to both ends of said cable for tensioning said cable.

22. A force feedback interface device as recited in claim 20 wherein said capstan drum includes a curved end over which said cable is routed, said cable coupled to said capstan drum at two different ends of said cable, and wherein said curved end includes flanges arranged on sides of said curved end to substantially prevent said cable from slipping off said sides of said curved end.

23. A force feedback interface device as recited in claim 13 wherein said user manipulandum is a joystick handle.

24. A force feedback interface device as recited in claim 13 wherein said linkage mechanism is a closed loop five-member linkage.

25. A force feedback interface device as recited in claim 13 wherein said spring selection mechanism includes a catch member coupled between said spring, and said linkage mechanism, wherein said catch member operates as a switch and is moveable by said user.

26. A force feedback interface device as recited in claim 20 further comprising a stop coupled to a ground, said stop preventing motion of said user manipulandum in a direction past a predetermined range, wherein said user manipulandum impacts said stop before said capstan drum reaches a limit to movement.

27. A force feedback interface device as recited in claim 13 wherein a sensing range for said force feedback interface device is dynamically determined, wherein said sensing range does not include positions of said user manipulandum sensed during said force application by said actuators in a direction towards a range limit corresponding with said positions.

28. A method for selectively providing a spring force in a force feedback interface device using a physical spring, the method comprising:
  selectively decoupling a spring member from a user manipulandum when an actuator of said interface device is to output forces on said user manipulandum, said user manipulandum being physically contacted by a user, wherein said spring member is coupled between said user manipulandum and a linkage mechanism, said user manipulandum physically contacted by a user to feel said forces output on said user manipulandum; and
  selectively coupling said spring member to said user manipulandum when said actuator is not to output forces on said user manipulandum, wherein said spring member provides a centering spring force on said user manipulandum when coupled to said user manipulandum for centering said user manipulandum a degree of freedom.

29. A method as recited in claim 28 wherein said forces output on said user manipulandum by said actuator include centering spring forces.

30. A method as recited in claim 28 wherein said selectively decoupling and selectively coupling are accomplished using a spring selection mechanism coupled to said linkage mechanism.

31. A method as recited in claim 28 wherein said selectively coupling said spring member is performed when said force feedback interface device is not powered.

32. A force feedback interface device coupled to a host computer and providing forces to a user manipulating said interface device, the interface device comprising;
  a user manipulandum for physical contact by a user;
  a sensor for detecting a position of said user manipulandum in a degree of freedom;
  an actuator coupled to said user manipulandum for applying a force to said user manipulandum;
  a linkage mechanism coupled between said actuator and said user manipulandum, said linkage mechanism providing said degree of freedom and transmitting said force from said actuator to said user manipulandum; and
  a capstan drive mechanism coupled between said actuator and said linkage mechanism, wherein said capstan drive mechanism includes a pulley coupled to said actuator, a moveable capstan drum coupled to said linkage mechanism, and a cable coupling said pulley to said capstan drum, said cable having two ends, wherein a tensioning spring member is coupled to both ends of said cable for tensioning said cable, and wherein said capstan drum includes a curved end over which said cable is routed, said curved end including flanges arranged on sides of said curved end to substantially prevent said cable from slipping off said sides of said curved end.

33. An interface device as recited in claim 32 wherein said degree of freedom is a rotary degree of freedom and wherein said capstan drum is coupled to a member of said linkage mechanism and rotates about an axis of rotation.

34. An interface device as recited in claim 32 wherein said curved end is approximately a portion of a circumference of a cylinder.

35. An interface device as recited in claim 32 further comprising a spring selection mechanism coupled to said linkage mechanism and selectively allowing a physical spring to be coupled to said linkage mechanism to provide a spring force on said user manipulandum.

36. An interface device as recited in claim 32 wherein a sensing range for said sensor is dynamically determined, and wherein said sensing range is not based on positions of said user manipulandum sensed during said force application by said actuators in a direction towards a range limit corresponding with said positions.

37. A force feedback interface device coupled to a host computer and providing forces to a user manipulating said interface device, the interface device comprising;
  a user manipulandum for physical contact by a user;
  a sensor for detecting a position of said user manipulandum in a degree of freedom;
  an actuator coupled to said user manipulandum for applying a force to said user manipulandum;
  a linkage mechanism coupled between said actuator and said user manipulandum, said linkage mechanism providing said degree of freedom and transmitting said force from said actuator to said user manipulandum; and
  a capstan drive mechanism coupled between said actuator and said linkage mechanism and providing mechanical advantage to said force, wherein said capstan mechanism includes a pulley coupled to said actuator, a moveable capstan drum coupled to said linkage mechanism, and a cable having two ends, each of said ends coupled to said capstan drum, said cable coupling said pulley to said capstan drum, and wherein said capstan drum includes a tensioning spring member coupled between one end of said cable and said capstan drum for tensioning said cable to reduce slack in said cable.

38. A force feedback interface device as recited in claim 37 wherein said tensioning spring member is coupled to both ends of said cable.

39. A force feedback interface device as recited in claim 38 further comprising an anchoring device coupled between said capstan drum and said cable, said anchoring device coupling said cable to said capstan drum to substantially prevent slippage of said cable with respect to said drum.

40. A force feedback interface device as recited in claim 39 wherein said anchoring device includes a clamp.

41. A force feedback interface device for providing forces on a user manipulating said interface device when coupled to a host computer, said force feedback interface device comprising:
  a user manipulandum for physical contact by a user;
  a sensor for detecting a position of said user manipulandum in a degree of freedom;
  an actuator coupled to said user manipulandum for applying a force to said user manipulandum;
  a linkage mechanism coupled between said actuator and said user manipulandum, said linkage mechanism providing said degree of freedom and transmitting said force from said actuator to said user manipulandum;
  a spring selection mechanism coupled to said linkage mechanism and selectively allowing a physical spring to be coupled to said linkage mechanism to provide a spring force to be applied on said user manipulandum; and
  a capstan drive mechanism coupled between said actuator and said linkage mechanism, wherein said capstan drive mechanism includes a capstan pulley coupled to said actuator, a capstan drum coupled to said linkage mechanism, and a cable coupling said capstan pulley to said capstan drum, wherein said capstan drum includes a tensioning spring member coupled to both ends of said cable for tensioning said cable.

42. A force feedback interface device coupled to a host computer and providing forces to a user manipulating said interface device, the interface device comprising:

a user manipulandum for physical contact by a user;

a sensor for detecting a position of said user manipulandum in a degree of freedom;

an actuator coupled to said user manipulandum for applying a force to said user manipulandum;

a linkage mechanism coupled between said actuator and said user manipulandum, said linkage mechanism providing said degree of freedom and transmitting said force from said actuator to said user manipulandum; and a capstan drive mechanism coupled between said actuator and said linkage mechanism, where in said capstan mechanism includes a pulley coupled to said actuator, a moveable capstan drum coupled to said linkage mechanism, and a cable coupling said pulley to said capstan drum, and wherein said capstan drum includes a tensioning spring member coupled to both ends of said cable for tension ing said cable.

* * * * *